United States Patent
Michael et al.

(10) Patent No.: US 9,921,880 B2
(45) Date of Patent: Mar. 20, 2018

(54) DYNAMIC PERFORMANCE ISOLATION OF COMPETING WORKLOADS ON CPUS WITH SHARED HARDWARE COMPONENTS

(71) Applicant: Oracle International Corporation, Redwood Shores, CA (US)

(72) Inventors: Nicolas Michael, San Francisco, CA (US); Chen Wang, Mountain View, CA (US); Jonathan Chew, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 121 days.

(21) Appl. No.: 15/009,395

(22) Filed: Jan. 28, 2016

(65) Prior Publication Data

US 2017/0220389 A1 Aug. 3, 2017

(51) Int. Cl.
*G06F 9/50* (2006.01)
*H04L 29/08* (2006.01)

(52) U.S. Cl.
CPC ............ *G06F 9/5027* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,587,938 B1 * | 7/2003 | Eilert | G06F 9/5061 712/13 |
| 8,112,756 B2 | 2/2012 | Cherkasova | |
| 8,255,915 B1 | 8/2012 | Blanding | |
| 8,327,373 B2 | 12/2012 | Srinivasan | |
| 8,539,078 B2 | 9/2013 | Duan | |

(Continued)

FOREIGN PATENT DOCUMENTS

CN 104142864 A 11/2014

OTHER PUBLICATIONS

Triage Performance Isolation and Differentiation for Storage Systems; obtained at http://citeseerx.ist.psu.edu/viewdoc/download?doi=10.1.68.2471&rep=rep1&type=pdf; Mar. 10, 2004; 24 pages.

(Continued)

*Primary Examiner* — Lewis A Bullock, Jr.
*Assistant Examiner* — Bruce S Ashley
(74) *Attorney, Agent, or Firm* — Trellis IP Law Group, PC

(57) ABSTRACT

A system and method for facilitating allocating computing resources to workloads, facilitating workload performance isolation. An example method includes determining one or more workloads to be allocated a set of computing resources in the computing environment, the one or more workloads characterized by metadata describing one or more workload properties; and using the one or more workload properties to calculate a binding between each of the one or more workloads and one or more corresponding portions of the computing resources. Plural competing workloads may be isolated by binding each workload to a disjunct set of Central Processing Units (CPUs) that share as few common hardware resources as possible given a topology the computing resources. Resource allocation adjustments need not require any reconfiguration of the system or adjustment to already provisioned workloads.

15 Claims, 13 Drawing Sheets

(56) References Cited

U.S. PATENT DOCUMENTS

| | | |
|---|---|---|
| 8,554,917 B2 | 10/2013 | Agarwala |
| 8,707,300 B2 | 4/2014 | Govindan |
| 9,389,874 B2* | 7/2016 | Cao ....................... G06F 9/4401 |
| 2010/0058346 A1* | 3/2010 | Narang ................. G06F 9/5066 |
| | | 718/102 |

OTHER PUBLICATIONS

CPU Sharing Techniques for Performance Isolation in Multi-tenant Relational Database-as-a-Service; obtained at http://www.vldb/vol7/p37-das.pdf; Copyright 2013, 12 pages.

Performance Isolation and Resource Sharing; obtained at http://i.stanford.edu/pub/cstr/reports/csl/tr/97/730/CSL-TR-97-730.pdf; Jul. 1997; 27 pages.

\* cited by examiner

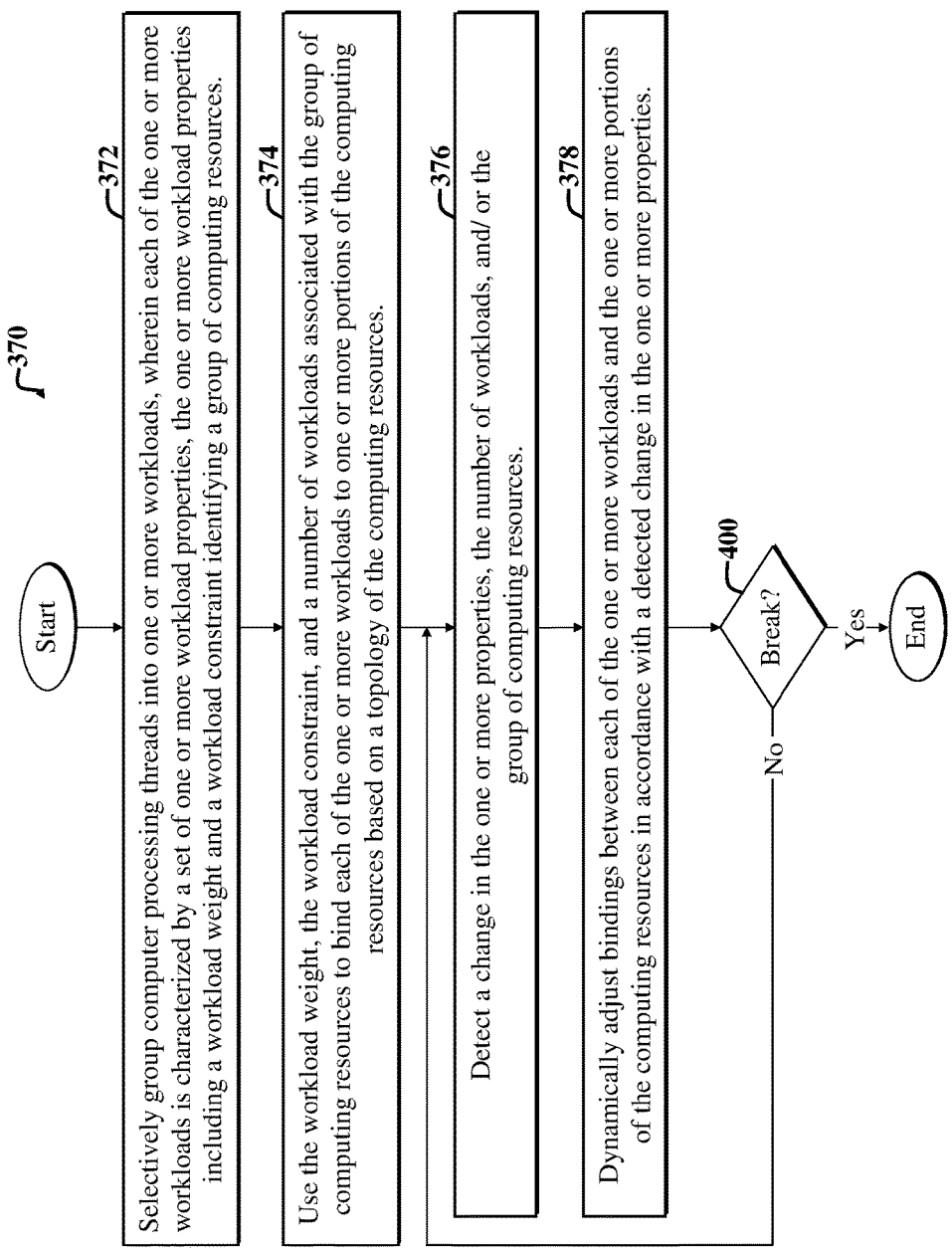

DYNAMIC PERFORMANCE ISOLATION OF COMPETING WORKLOADS ON CPUS WITH SHARED HARDWARE COMPONENTS

BACKGROUND

The present application relates to computing and more specifically to software and accompanying systems and methods for managing or allocating computing resources of a computing environment.

Systems for allocating computing resources, including hardware resources, are employed in various demanding applications, including allocation of data center computer processing and memory resources for cloud-based web services and associated applications and databases, allocation of computer resources for individual desktop software programs, various concurrent computing and/or multiprocessing applications, and so on.

Such applications often demand readily configurable dynamic resource management mechanisms for efficient on-demand allocation of computing resources to workloads (which may correspond to particular databases, projects, or other applications and/or processes, etc.), such that competing workloads exhibit minimal mutual interference; require minimal resource reallocation to maximize Quality of Service (QoS); facilitate computing resource capacity planning and load prediction; efficiently accommodate changing workloads, priorities, and hardware topologies; minimize performance of non-critical workloads on critical workloads; maximize system utilization while balancing aforementioned priorities, and so on, all without burdening system administrators or software applications with undue complexity.

Efficient resource management mechanisms are particularly important in multiprocessing applications used in cloud-based enterprise environments, including XaaS (Everything as a Service) environments, where computing resources may be distributed among many servers and may be shared by many enterprise software applications. Computing workloads or tenants (e.g., corresponding to different enterprise database instances) that are consolidated and run using a common set of hardware resources may suffer mutual performance interference and degradation when a given workload becomes more active.

Conventionally, different configurable shares of Central Processing Unit (CPU) cycles may be manually allocated to different workloads, where the maximum allocated CPU cycles are capped for each workload. However, such static or manual binding of workloads to disjoint CPUs often requires detailed knowledge of hardware topology and up-front resource allocation before the various workloads are deployed. In addition, resources required for each workload may be initially unknown, and the addition or removal of a workload to/from the system may require manual reallocation of computing resources. Furthermore, reliance upon such conventional resource allocation methods is often not feasible or practical for cloud-based application deployments, especially those requiring on-demand resource allocations.

Alternatively, CPU threads are automatically allocated to workloads based on available hardware resources, such that the workload threads are spread approximately evenly across computing environment resources. However, with such conventional resource allocation mechanisms, various issues, including mutual workload performance degradation, remain. Hardware architectures that share resources may still exhibit excessive performance interference between workloads.

In general, while certain resource-allocation mechanisms may selectively restrict workload resource consumption, such mechanisms often do not effectively minimize workload performance interference and accompanying mutual performance degradation. Existing mechanisms often ineffectively balance a tradeoff between system resource utilization and workload mutual performance degradation.

Accordingly, traditional computing resource management systems often lack efficient mechanisms for reducing workload mutual performance interference, especially when the computing resources may include several component processors that share various caches, pipelines, and other resources, the various resources of which may be arranged or connected hierarchically.

SUMMARY

An example method facilitates allocating resources, such as CPU resources and associated memory, pipelines, and so on, in a computing environment. The example method includes determining one or more workloads to be allocated a set of computing resources in the computing environment, wherein the one or more workloads are characterized by metadata describing one or more workload properties; and using the one or more workload properties to calculate a binding between each of the one or more workloads and one or more corresponding disjoint portions of the computing resources.

In a more specific embodiment, each of the one or more workloads is associated with one or more threads, the threads being grouped by workload. Each of the one or more workloads may be associated with a particular software application (e.g., pluggable database (PDB) instance), process, component, project, or other computing task.

The one or more corresponding portions of the computing resources may include computing resources that are related in accordance with a hierarchy. The hierarchy may include a hierarchy of groups of CPUs and associated processing and memory resources (e.g., cache, pipelines, etc.). At a lowest level of the hierarchy, the one or more corresponding portions of the computing resources include one or more CPU shares of one or more CPU cores.

The one or more workload properties include a workload weight, which may be set by an administrator and/or automatically by the software application or process producing the workload. The specific example method further includes using the workload weight to allocate computing resources of a group of computing resources to each of the one or more workloads, and then allocating the computing resources within the group of computing resources to a particular workload in proportion to the ratio of the workload weight to the sum total of workload weights of all workloads to be allocated resources from among the group of computing resources comprising a resource pool.

A constraint property of a workload (also called the workload resource constraint), specifies a particular group of computing resources available for assignment to the one or more workloads. The constraint may specify, for example, that threads of a given workload shall be allocated to a particular locality group or list of locality groups.

An alternative example method for allocating computing resources includes selectively grouping computer processing threads into one or more workloads, wherein each of the one or more workloads is characterized by a set of one or more workload properties, the one or more workload properties including a workload weight and a workload constraint identifying a group of computing resources; using the workload weight, the workload constraint, and a number of workloads associated with the group of computing resources to bind each of the one or more workloads to one or more disjoint portions of the computing resources; detecting a change in the one or more properties, the number of workloads, or the group of computing resources; and dynamically adjusting bindings between each of the one or more workloads and the one or more portions of the computing resources in accordance with the detected change.

The one or more workloads may include plural workloads. Plural workloads may be isolated from each other by binding each workload to a disjoint set of CPUs, where each disjoint set of CPUs shares as few common hardware resources as possible given a topology of the computing resources. The topology may include hierarchically related groups of computing resources, including processor groups. The one or more processor groups each identify a disjunct set of CPUs. Workload performance isolation may then involve ensuring that different workload constraints that are of the same type as that of the workload to be isolated are bound to non-overlapping computing resource pools.

The step of dynamically adjusting may further include, for each set of one or more workloads characterized by similar constraints, recalculating bindings (between the one or more workloads and the portions of the computing resources of the group of computing resources identified by the similar constraints) when a number of workloads of each set changes; when a topology characterizing the group of computing resources changes, or when a property of a workload of the set changes.

The alternative method may further include determining an arrangement (characterizing the topology) of the group of computing resources in accordance with a combination of computer processing resources and associated memory resources (which may include caches, pipelines, translation lookaside buffers, etc.), such that allocation of CPU shares to a workload corresponds to simultaneous allocation of memory resources along with the CPU shares, thereby facilitating hardware isolation. The arrangement of the group of computing resources may be characterized by one or more locality groups (e.g., Non-Uniform Memory Access (NUMA) nodes), several of which may be associated with a given CPU socket or hardware chip module.

Hence, certain embodiments discussed herein provide a procedure that may allocate CPU resources to workloads while minimizing shared hardware components/resources, thereby significantly reducing mutual performance impact and QoS degradation of competing workloads. Furthermore, use of such a procedure or procedures enables efficient on-demand provisioning of new workloads, where resource allocation adjustments do not require any reconfiguration of the system or adjustment to already provisioned workloads.

For example, a system administrator may adjust workload properties, triggering automatic resource reallocation, or a software application associated with a given workload may automatically adjust the workload properties in accordance with a predetermined methodology. This enables efficient accommodation of systems with changing workloads and/or hardware topologies.

Accordingly, various embodiments may enable maximum workload computing resource utilization with minimum mutual interference between workloads, all without requiring strict or static resource partitioning and allocation. Workload resource allocation adjustments that are needed to effectively balance the tradeoff between interference (e.g., interference that results in mutual performance degradation) and total resource utilization may be performed dynamically, i.e., automatically. Requisite adaptations may be implemented at minimal cost, during running of the accompanying system, without any interruption of workload processing.

A further understanding of the nature and the advantages of particular embodiments disclosed herein may be realized by reference of the remaining portions of the specification and the attached drawings.

BRIEF DESCRIPTION OF THE DRAWINGS

FIG. 10 is a flow diagram of a second example method suitable for use with the embodiments of FIGS. 1-9.

DETAILED DESCRIPTION OF EMBODIMENTS

Figure 1:
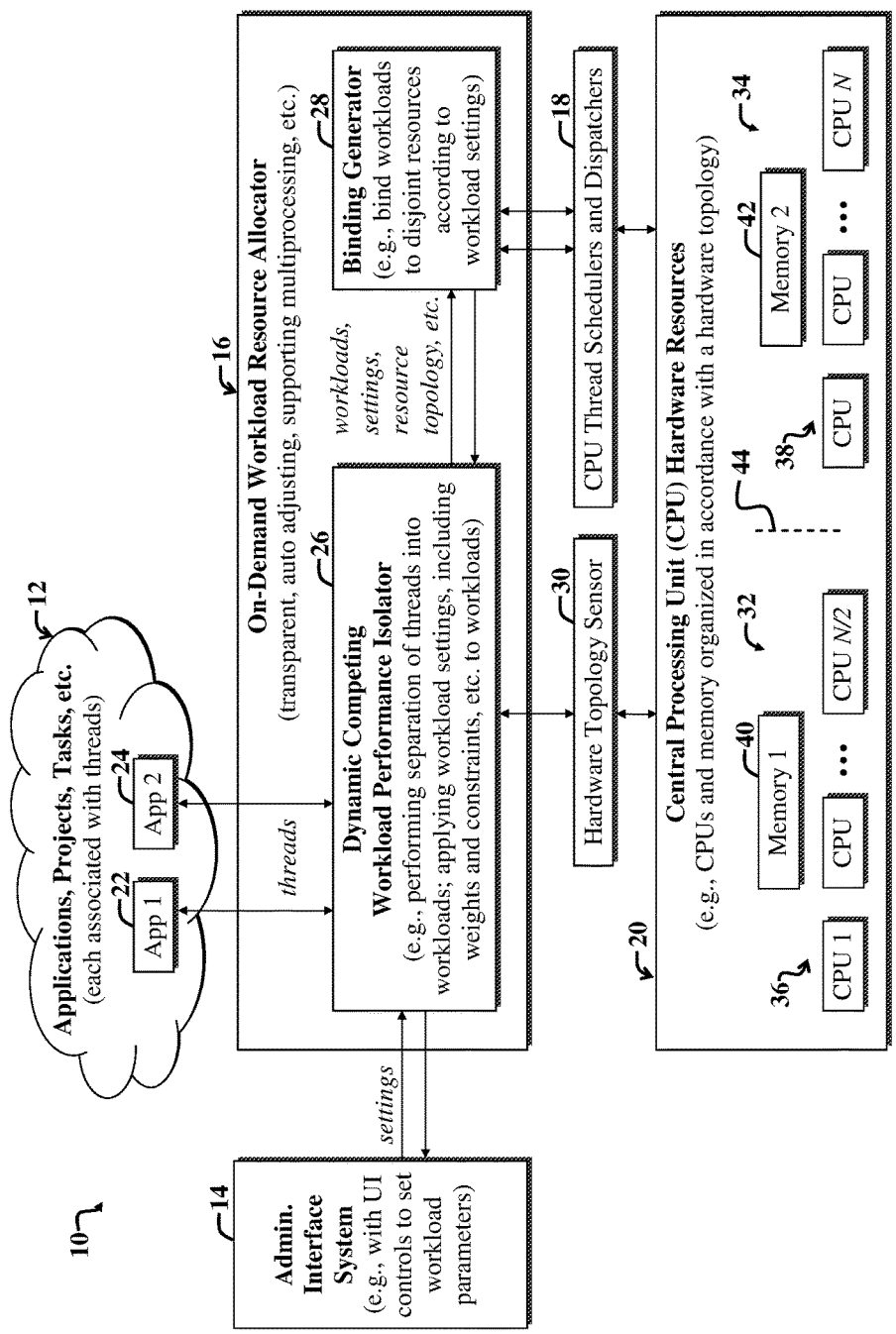
FIG. 1 illustrates a first example system and accompanying computing environment configured to enable dynamic allocation of computing resources to workloads to minimize workload interference and maximize system resource utilization.

Ensuring performance isolation and differentiation among workloads sharing computing resources, including storage infrastructure, can be a basic requirement of consolidated data centers.

Existing conventional management tools often rely upon resource provisioning to meet performance goals. However, effective use of such tools often requires detailed knowledge of the system characteristics and the workloads. Accordingly, provisioning adjustments often problematically lag changes in system and workload dynamics, including changes in the number of workloads using the system, changes to hardware, changes to resources demanded by workloads, changes to priorities of workloads, and so on. This can be particularly inefficient and costly. Furthermore, provisioning for the worst case is often impossible when using conventional provisioning or resource allocation tools.

Resource consolidation in large data centers is a current trend across the Information Technology (IT) industry, driven by economy-of-scale benefits. Consolidation is performed either within enterprise and/or hosting environments.

Associated data centers may employ storage systems that are shared by workloads of multiple users, e.g., customers. In such environments, customers often demand computing resources and performance that they are entitled to. Accordingly, the workload performance must often be isolated from the activities of other workloads that share the same computing resources and accompanying computing infrastructure. Furthermore, preferably, available resources are shared among workloads according to their relative importance.

Although resource provisioning can be necessary to meet the basic workload performance goals, existing workload provisioning mechanisms generally cannot efficiently accommodate rapid workload fluctuations and system changes. Provisioning resource adjustment using conventional mechanisms can be prohibitively expensive and slow, and may include, for example, setting up servers, configuring logical volumes in disk arrays, migrating data, and so on.

Multi-tenancy and resource sharing can be essential to make a Database-as-a-Service (DBaaS) cost effective. However, one major consequence of resource sharing is that the performance of one tenant workload can be significantly affected by the resource demands of co-located tenants. In other words, traditionally, workloads or tenants consolidated on a common set of hardware resources often suffer from mutual performance interference, e.g., degradation of a workload's performance, if other workloads become more active.

The lack of performance isolation in a shared environment can make DBaaS less attractive to performance-sensitive tenants. Various embodiments, as discussed below, can effectively address such issues, e.g., by facilitating on-demand dynamic allocation of resources to workloads via Multi-CPU Binding (MCB) to disjoint hardware resources.

For the purposes of the present discussion, the term "resource" as used herein, may generally refer to one or more components or aspects of or in a computing environment. Accordingly, a hardware resource may be any computer hardware or circuits, e.g., processors, memory, pipelines, cache, power control modules, and so on. Depending upon the context in which the term is used, the term "hardware resource" may also refer to or be taken to include virtualized hardware resources, e.g., hardware resources that are made available to software applications running within Virtual Machines (VMs), as discussed more fully below.

The terms "hardware resource" and "CPU resource" may be employed interchangeably herein when referring to resources associated with a CPU. Examples of CPU resources include, but are not limited to CPU clock cycles (or processor shares), CPU cache, pipelines, power control units, memory control units, buffers, and so on.

Similarly, a network resource may be any network entity or characteristic. Examples of network entities include software (e.g., web services, enterprise applications, etc.), including software systems and accompanying infrastructure, computers, switches, interfaces, batteries, networks, and so on.

A web resource may be anything that can be named and addressed via a computer network, including computing language classes, objects, web services, a message payload indicating a provisioning order for cloud services, and so on. In general, anything that may be electronically referenced in a networked computing environment, e.g., via a Uniform Resource Identifier (URI) or web address, such as a URL, can be considered a web resource. A URI may be any string of characters specifying a network address.

For the purposes of the present discussion, a computing system or computing environment may be any collection of computing resources used to perform one or more tasks involving computer processing. An example computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

An enterprise computing environment may be any computing environment used for an enterprise. An enterprise may be any organization of persons, such as a business, university, government, military, and so on. The terms "organization" and "enterprise" are employed interchangeably herein.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include Financials, Assets, Procurement, Projects, Supply Chain, and so on. The terms "enterprise software," "enterprise software application," and "enterprise application" may be employed interchangeably herein.

For the purposes of the present discussion, a server may be any computing resource, such as a computer and/or software, that is adapted to provide content, e.g., data and/or functionality, to another computing resource or entity that requests it, i.e., the client. A client may be any computer or system that is adapted to receive content from another computer or system, called a server. An SOA (Service-Oriented Architecture) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

When the term "domain" is used herein with reference to a database, e.g., an enterprise database, the database describes the domain. For example, a CRM database is said to characterize a CRM domain, which may include a set of related computing objects characterizing customer relationship management data and functionality. The computing objects may represent business transactions.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices.

Note that conventionally, certain enterprise software customers (e.g., enterprises using the enterprise software) may subscribe to and access enterprise software by subscribing to a particular suite of cloud services offered via the enterprise software. Various components of the enterprise software may be distributed across resources (e.g., servers) of a network.

For clarity, certain well-known components, such as hard drives, operating systems, process schedulers, power supplies, routers, the Internet, and so on, are not necessarily explicitly called out in the figures. However, those skilled in the art with access to the present teachings will know which components to implement and how to implement them to meet the needs of a given implementation.

FIG. 1 illustrates a first example system 10 and accompanying computing environment configured to enable dynamic allocation of computing resources to workloads to minimize workload interference and maximize system resource utilization.

For the purposes of the present discussion, a workload may be any demand placed on computing resources pertaining to a computing task, such as the running of a software application, service, process, or portion thereof. For example, a given software application, e.g., a database instance, may demand a certain number of CPU shares available to the system, where a CPU share may be any portion of CPU processing resources, e.g., a number of CPU clock cycles. A CPU share can include computing resources in addition to clock cycles, including any cache, pipelines, and so on, used by the CPU to implement processing.

A CPU may be any computing hardware, e.g., electronic circuitry, that processes instructions of a computer program or process. A CPU (also abbreviated as "C" herein) often includes an Arithmetic Logic Unit (ALU) in communication with a memory controller, wherein the ALU has access to machine instructions, i.e., computer code.

For the purposes of the present discussion, a computer processor is a type of CPU. The terms computer processor, microprocessor, and processor are employed interchangeably herein to refer to the smallest CPU processing element, i.e., a CPU contained on a single integrated circuit chip. Note that CPUs may include multiple processors. When a CPU includes multiple constituent processors, the CPU is called a multi-core processor, and each constituent processor of the larger CPU is called a CPU core (or simply core). In certain cases, the term CPU is also abbreviated simply as "C."

In general, a workload is associated with a group of threads (which may include all threads belonging to a workload, such as an application, part of an application, tenant in a multi-tenant environment, etc.). Software applications and/or associated platforms may express such a relationship (relating threads to workloads) through one or more Application Programming Interfaces (APIs), as discussed more fully below.

For the purposes of the present discussion, a thread may be the smallest sequence of computer instructions that is independently manageable via a CPU scheduler and/or dispatcher. Accordingly, a thread may correspond to an element of a larger process that corresponds to a workload.

Depending upon the context in which the term is used, a thread may also refer to, or alternatively refer to, an elemental portion of CPU processing capacity. Note that in general, with multi-threaded computing resource hardware (e.g., CPUs), multiple threads may comprise the same process or workload and may be executed concurrently.

Note that certain Operating Systems (OSs), such as Solaris, support use of projects to group related work. In such context, a workload may be equivalent to or otherwise represent a project. In general, threads of a given workload can be bound to a set of CPUs via CPU bindings. The system 10 supports Multi-CPU Binding (MCB) of workloads to CPUs and associated resources, including weak and strong binding, as discussed more fully below. Note that a given thread typically has only one CPU binding, which can bind the thread to one or more CPUs. Also note that embodiments are not limited to MCB, as other associations or affinities characterizing a binding (not necessarily an MCB) between threads of a workload and computing resources may be employed. Accordingly, CPU thread schedulers and dispatchers 18 may enforce affinity between workload threads and computing resources via mechanisms other than via MCB. In general, the process of binding a workload to hardware resources may refer to any affining (i.e., establishing an affinity or association) of a workload to hardware resources. Accordingly, the term "binding" is not limited to MCB.

A weak binding expresses a preferred set of CPUs (and associated hardware resources) to be allocated to a workload, where threads of the workload are permitted to run on other CPUs (i.e., CPUs not identified by the CPU preference indicated by the weak binding), e.g., when the preferred CPUs are overloaded. A strong binding is strict, such that it cages or confines threads of a workload to run on an identified (identified by the binding) set of CPUs. The weak or strong property of a binding is called the affinity type of the binding. The affinity type of the binding used to bind a particular workload to CPU resources may be established by adjusting affinity type settings for a particular workload, as discussed more fully below.

The example system 10 includes an on-demand workload resource allocator 16 for allocating CPU resources to workloads that comprise or are otherwise associated with threads of software applications, processes, services, and/or other computing tasks 12, such as a first application 22 and a second application 24. The on-demand workload resource allocator 16 includes a dynamic competing workload performance isolator 26 in communication with a binding generator 28.

The binding generator 28 includes computer code for generating and applying a binding between a workload and one or more portions of CPU hardware 20. A hardware topology sensor 30 may provide topology information (specifying an arrangement and architecture of the CPU hardware) to the dynamic competing workload performance isolator 26. Alternatively, or in addition, resource topology information is predetermined, e.g., as may be specified by a system administrator with access to an administrator interface system 14.

Various settings to be applied to a given workload may be specified via the administrator interface system 14. In addition, or alternatively, workload settings may be automatically set by the software applications 22, 24. In certain implementations, changes in topology of the CPU hardware resources 20 may be detected by the hardware topology sensor 30 and then relayed (as additional input) to the dynamic competing workload performance isolator 26.

The hardware topology sensor 30 may be omitted, without departing from the scope of the present teachings. Note that the system 10 may be implemented via one or more servers and/or server clusters and/or other computing environment resources.

Note that in general, with reference to FIG. 1, groupings of (and connections between) various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the bindings generator 28 may be grouped within the dynamic competing workload performance isolator 26; the CPU thread schedulers and dispatchers 18 may be included within a hypervisor (Virtual Machine (VM) monitor or VM server), as may be the hardware topology sensor 30.

In an example scenario, a systems administrator (or other authorized user) employs the administrator interface system 14 to configure workload settings for the applications 22, 24. The applications 22, 24 present workloads to the on-demand workload resource allocator 16. The administrator interface system 14 may be a computer, software, and/or virtual machine that includes Graphical User Interface (GUI) software providing a GUI that enables an authorized user, e.g., system administrator, to specify different settings or properties for different workloads associated with different applications 22, 24 using the system 10.

The dynamic competing workload performance isolator 26 includes computer code for organizing incoming threads into workloads; applying or associating workload settings or properties thereto, and packaging the threads for routing through the binding generator 28, which may also apply the bindings to the workload threads. The dynamic competing workload performance isolator 26 may also send a description of the hardware topology (characterizing the CPU hardware resources 20) to the workload resource allocator 16 for implementations that must automatically adapt to changes in hardware resources 20 (e.g., the removal or addition of new computing resources, changes in hardware resource topology, and so on).

A hardware topology description may describe an arrangement and relationships between hardware resources 20, including CPUs 36, 38, memories 40, 42 (including cache), power control modules, pipelines, Translation Look Aside Buffers (TLBs), and so on. The topology (also called resource architecture) may be hierarchical and may include hardware resources that are arranged in groups. The topology may refer to an actual physical hardware topology, and/or may refer to a virtualized hardware topology, whereby a virtual machine presents the hardware resources 20 to the system 10 as though the hardware resources 20 are arranged in accordance with a virtualized topology or architecture.

For illustrative purposes, the topology characterizing the hardware resources 20 is shown including a first example grouping of CPUs and associated resources 32 and a second example grouping of CPUs and associated resources 34. The first set of CPUs 36 share a first memory or cache 40. Similarly, the second set of CPUs 38 share a second memory or cache 42. Note that in practice, hardware resources and associated topologies may vary.

The first group of hardware resources 32 is said to be disjunct or disjoint relative to the second group of hardware resources 34, as the groups 32, 34 share a minimal amount of (or zero) computing resources between the groups 32, 34. In general, disjoint sets of hardware resources in a given hardware resource topology may refer to any groups of CPUs on the same level of a hardware resource topology that do not share memory on that level of the topology.

For example, at level 1 of a topology, CPUs using the same level 1 cache may form a group, which is said to be disjunct or disjoint from another group of CPUs using a different level 1 cache on the same level of the hardware topology, as discussed more fully below. Accordingly, the terms disjunct and disjoint are employed interchangeably herein to refer to groups of hardware resources on a given hardware resource topology level that do not share hardware resources at that level.

In the present example embodiment, different groups of CPUs, which are disjoint along CPU group (also called processor group) boundaries (e.g., the example boundary 44), are bound to different workloads via the binding generator 28 and accompanying dynamic competing workload performance isolator 26. Accordingly, the workloads (e.g., corresponding to the applications 22, 24) are said to be isolated along Processor Group (PG) boundaries, which may also correspond to boundaries between locality groups and/or Non-Uniform Memory Access (NUMA) nodes, and so on.

In general, the hardware resources 20 are characterized by a multiprocessing topology. A multiprocessing topology may be any CPU resource architecture that includes two or more CPUs within a single computer system, where the computer system supports allocating tasks between the different CPUs and associated resources.

For the purposes of the present discussion, the term NUMA refers to any hardware resource arrangement or topology, where memory access time is a function of memory location relative to the CPU or processor. In general, a NUMA node, which may correspond to a node in a hardware topology diagram, includes memory that is shared by CPUs or processors in the NUMA node (also called NUMA group).

The terms NUMA node and locality group may be employed interchangeably herein. However, in general, in the present discussion, the term locality group refers to a group of CPUs within a larger NUMA node that contains sub-groups.

The terms locality group (called lgroup) and processor group may also be employed interchangeably herein to refer to any collection or group of CPUs that share a memory on the level of the hardware resource topology in which the grouping is considered. For example, all CPUs sharing the same level 3 cache may represent a locality group or processor group formed at level 3 of a hierarchical hardware resource topology.

A hierarchical topology may refer to any arrangement of resources, wherein degrees of shared resources change at different levels of the hierarchy, such that resources at lower levels of the hierarchy may share some additional resources, e.g., cache or other memory or resources with other resources, at the next higher level. Note that embodiments are not limited to allocation of workloads to hierarchical hardware resource topologies. Resource topologies that only include one level may be allocated to workloads so as to maximize workload performance isolation by binding workloads to disjoint CPUs, without departing from the scope of the present teachings.

Those skilled in the art will appreciate that the system 10 may be readily implemented using various operating systems, e.g., Solaris. The system 10 may also work with computing environments employing various guest operating systems, as discussed more fully below with reference to FIG. 2. A Solaris operating system generally organizes hardware resources, including CPUs, cache, Input/Output (I/O) devices, and so on, into one or more locality groups corresponding to NUMA nodes, based on mutual proximity of the resources, such that hardware resources in an lgroup are local to that lgroup.

Hence, an lgroup indicates that hardware resources within the lgroup are relatively close, such that memory access times, etc., are minimized. Depending upon the context in which the term is used, an lgroup may also refer to groupings of virtualized hardware resources and/or actual physical hardware resources.

The example system 10 meets several design parameters, including: 1) Threads are grouped as workloads. 2) A given thread belongs to at most one workload (i.e., group of threads), and workloads may be unrelated. 3) A CPU scheduler and/or dispatcher (e.g., the CPU thread schedulers and dispatchers 18) act to keep threads of a workload close together, i.e., to dispatch threads of a workload on CPUs that share as much performance-relevant hardware components as possible, while keeping threads from different workloads separate. 4) Workloads support properties (also called workload settings herein) that define a strict or weak affinity to hardware resources, in addition to properties specifying a relative amount of hardware resources needed (e.g., as may be specified by a workload weight property or setting) by the workload. 5) The affinity of a workload to hardware components dynamically adjusts if new workloads become active; are deleted; are created and run; or when other properties of one or more competing workloads change. 6) Workloads can be confined to a single NUMA node or spread across multiple NUMA nodes, e.g., across all available NUMA nodes or one or more subsets thereof.

Accordingly, the workload settings, also called workload properties herein, include workload binding affinity type, workload weight, workload constraint, and a NUMA interleave setting. The workload properties may represent a type of workload metadata, i.e., data describing or characterizing a workload. The dynamic competing workload performance isolator 26 includes the metadata or associated tag along with a given workload handled by the system 10. Note that in certain implementations, one or more of the workload properties may be omitted or otherwise not specified, without departing from the scope of the present teachings.

The example applications 22, 24 represent competing workloads. For the purposes of the present discussion, competing workloads may be any workloads that are to be allocated hardware and/or other computing resources from a common set of hardware resources 20. Note that if an additional application, e.g., a database instance, is added to the applications 12, then the dynamic competing workload performance isolator 26 automatically adjusts the workload information and associated resource allocations.

The adjusted workload information may specify updates to the number of competing workloads and their settings, along with topology information characterizing the topology of the hardware resources 20. In the present example embodiment, the adjusted workload information may be provided to the binding generator 28, e.g., via the dynamic competing workload performance isolator 26. The binding generator 28 then automatically adjusts workload bindings and associated resource allocations, without requiring any manual changes to the other applications 22, 24 and associated workload settings.

Similarly, a system administrator or other authorized user may employ the administrator interface system 14 to adjust settings or properties of one or more workloads. Changes in the settings then automatically affect workload bindings along disjoint hardware resource boundaries in accordance with the new settings, helping to maximize performance isolation between the workloads.

Example pseudo code for implementing the binding generator 28 is as follows, where comments are proceeded with "//":

```
// Parameter "PGs" refers to the processor group topology, where PGs[i] is the number of
// PGs at level i. The level of a leaf PG, i.e., lowest level processor group is i = 0.
// Parameter "weight" represents weights of all workloads.
Function BindWorkloads (Inputs: PGs, weight)
// Return binding information for all workloads, i.e., return WorkloadBinding[ ].
{
//First sort input workloads by weight in ascending order:
Arrays.sort (Input: weight);
//Next, calculate overall weight and number of workloads:
Integer N = weight.length;
Integer TotalWeight = 0;
For (integer i = 0; while i < weight.length; increment i after each cycle of the following)
    {
        The new TotalWeight = weight[i] + the previous TotalWeight.
    }
// Now, generate and/or update a binding:
Binding = new WorkloadBinding[Input: Integer N];
Integer AssignedWeight = 0;           // Already assigned weight.
Integer RemainingWeight = TotalWeight;  // Remaining weight to be assigned.
Integer CurrentWeight;                 // Remaining weight to be
                                       // considered.
```

-continued

```
Integer NextPosition = 0;              // Next PG index to bind to.
Integer LastLevel = −1;                // PG level of last binding.
// For each workload:
For (integer i = 0; while i < weight.length; increment i after each cycle of the following)
    {
        // Base allocation decisions on the remaining weight, but do not
        // allocate more PGs than the number of PGs that exist in the system:
        CurrentWeight = Math.min (RemainingWeight, PGs[0]);
        //Determine the optimal PG level to bind to given the current weight:
        Integer level = GetLevel (PGs, CurrentWeight);
        If (level does not equal Last Level) then
            {
                // Levels have switched; so start binding at PG index 0:
                NextPosition = 0;
                LastLevel = level;
            }
        // Calculate the number of PGs to bind to in proportion to
        // CurrentWeight:
        Integer Count = Math.max (PGs[level] * weight[i] / CurrentWeight, 1);
        // Truncate number of PGs if a wraparound would occur, which is
        // potentially unfair to the last workload:
        Count = Math.min (count, PGs [level] − NextPosition);
        // The binding for workload i becomes:
        Binding[i] = new WorkloadBinding (weight[i], level, NextPosition,
count);
        // Add weight[i] to the AssignedWeight to get the new AssignedWeight:
        AssignedWeight = AssignedWeight + weight[i];
        // Add count to the NextPosition to get the new next position:
        NextPosition = NextPosition + count;
        If (NextPosition > PGs[level]) then
            {
                // In the event of a wrap around, reduce the remaining
                // weight by the already assigned weight to potentially
                // by the already assigned weight to potentially allow
                // selection of a different PG level for the remaining
                // workloads:
                RemainingWeight = RemainingWeight − AssignedWeight;
                AssignedWeight = 0;
                NextPosition = 0;
            }
    }
Return binding;
}
```

Hence, workloads are allocated a relative amount of hardware resources within a shared locality group or PG in accordance with workload weight, such that the workload is assigned an amount of resources in proportion to the weight of the workload relative to the total weight of all competing workloads. A hierarchical hardware resource topology (also called PG topology herein) may be cycled through at various levels (and resources allocated to workloads in accordance with workload weight properties), while allocating resources along PG boundaries, thereby facilitating workload performance isolation.

In summary, threads or processes forming a workload are bound to a common set of CPUs, which share portions of hardware resources (such as pipelines or caches). Workloads are dynamically isolated along hardware component boundaries (including pipelines and caches), lgroups, other specified resource pools (e.g., sets or lists of lgroups), and so on.

The on-demand workload resource allocator 16 facilitates implementing so-called Multi-CPU Binding (MCB) to workloads using a procedure to allocate CPU resources to workloads (e.g., collections of threads), while minimizing the degree of mutually shared hardware components, thereby significantly reducing mutual performance impact on degradation of QoS of a workload by another workload. With MCB as discussed herein, threads of a workload are bound to the same set of CPUs at all times, using either weak or strong MCB binding, according to the affinity type property of the workload.

Those skilled in the art with access to the present teachings will appreciate that various existing APIs may be included in existing operating systems, the APIs of which include software functionality (e.g., as provided via function libraries, etc.) to facilitate implementing bindings as discussed wherein, without undue experimentation.

Hence, the system 10 provides readily configurable dynamic resource management mechanisms for efficient on-demand allocation of computing resources to workloads, such that competing workloads exhibit minimal mutual interference; require minimal resource reallocation to maximize QoS; facilitate computing resource capacity planning and load prediction; efficiently accommodate changing workloads, priorities, and hardware topologies; minimize performance of non-critical workloads on critical workloads; maximize system utilization while balancing aforementioned priorities; all without burdening system administrators or software applications with undue complexity.

Figure 2:
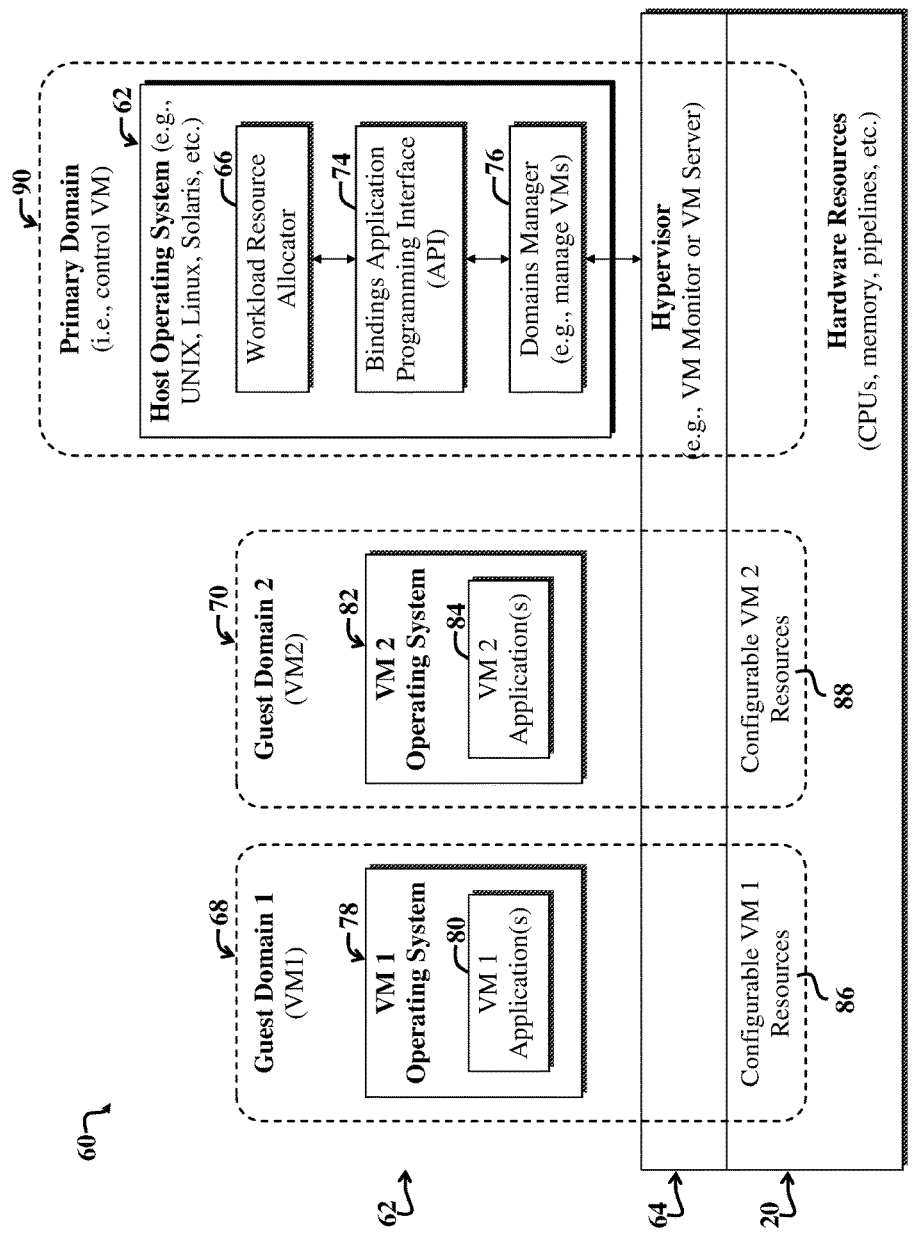
FIG. 2 illustrates a second example system and accompanying computing environment configured for efficient workload resource allocation of virtualized hardware resources.

FIG. 2 illustrates a second example system 60 and accompanying computing environment configured for efficient workload resource allocation of virtualized hardware resources, e.g., virtual representations of the hardware resources 20 and associated topologies. Note that in the present example embodiment, guest virtual machines, i.e., VMs 68, 70 (also called guest domains herein), and the host domain (also called the primary domain or the control VM) may be managed, in part by a host operating system 62, in implementations where the VMs 68, 70 represent kernel zones. Alternatively or in addition, resources of the domains 68, 70, 90 are managed by a hypervisor 64, and no host operating system exists between the guest domains 68, 70 and hardware resources 20; just the hypervisor 64. Furthermore, note that while in some implementations, dynamic resource allocation may be implemented inside the hypervisor 64, a preferred implementation includes using the host operating system 62 to apply dynamic resource allocation to kernel zones (e.g., instead of logical domains (LDOMs) specifically). Hence, VMs that represent kernel zones may run under control of a host operating system that applies workload isolation to the VMs; and alternatively, or in addition, VMs representing LDOMs may run under control of a hypervisor, which applies workload isolation thereto in accordance with the present teachings. Alternatively or in addition, resources of the domains 68, 70, 90 are managed by a hypervisor 64, and no host operating system exists between the guest domains 68, 70 and hardware resources 20; just the hypervisor 64. Furthermore, note that while in some implementations, dynamic resource allocation may be implemented inside the hypervisor 64, a preferred implementation includes using the host operating system 62 to apply dynamic resource allocation to kernel zones (e.g., instead of LDOMs specifically). Hence, VMs that represent kernel zones may run under control of a host operating system that applies workload isolation to the VMs; and alternatively, or in addition, VMs representing LDOMs may un under control of a hypervisor, which applies workload isolation thereto in accordance with the present teachings.

In general, the various CPU and memory allocations implemented by the system 60 may represent memory available to physical systems, e.g., servers or server clusters, or memory available to virtualized servers that run various virtual machines within the virtual servers.

In general, a server running on or represented by a virtual machine is said to be virtualized. For the purposes of the present discussion, a virtualized computing process or application may be a process or application that is associated with a layer of abstraction, called a virtual machine, that decouples, at least in part, physical hardware from the process or application. A virtual machine may have so-called virtual hardware, such as virtual RAM, Network Interface Cards (NICs), and so on, upon which virtualized applications, such as operating systems and servers, are loaded. The virtualized computing processes may employ a consistent virtual hardware set that can be substantially independent of actual physical hardware.

Note that the servers may be fully virtualized machines, but need not be. For the purposes of the present discussion, a fully virtualized machine may be any virtualized machine that provides a substitute for a real machine (in terms of functionality offered) and includes functionality for executing an operating system. A process virtual machine may be any virtual machine that is adapted to execute a single computer program or component by providing a fully or partially platform-independent program execution environment. In the present example embodiment, various virtual machines running applications (e.g., applications VM1 applications 80 and VM 2 application 84) represent process virtual machines.

For the purposes of the present discussion, a logical domain may be a VM that includes a logical grouping of computing resources or otherwise represents a virtualized partition of a computing system, where each partition uses a subset of system hardware resources. An example of a hypervisor that is adapted to facilitate creating and running such VMs is the Oracle VM Server for Scalable Processor ARChitecture (SPARC).

Operating systems running within a VM may be started, stopped, and rebooted independently. A running VM can be dynamically reconfigured to add or remove hardware resources, including CPUs, Random Access Memory (RAM), I/O devices, and so on, without requiring system reboot.

In general, a logical domain hosts a guest operating system within a computer system. Various software applications can be run in different logical domains to facilitate operational independence and for performance and security purposes.

For the purposes of the present discussion, a hypervisor may be any collection of computer code or instructions, which may be implemented in software and/or firmware, for creating and running VMs. Hypervisors or virtual machine monitors may facilitate interfacing virtual machines to underlying hardware. Hypervisors may include or leverage firmware to provide a stable VM architecture enabling installation of a guest operating system thereon.

In general, a computer system running a virtual machine is called a host machine, and the virtual machine is called a guest machine. A hypervisor, such as the hypervisor 64, may provide guest operating systems (e.g., operating systems 78, 82), with virtual operating platforms and may manage the execution of the guest operating systems. Plural operating system instances may share virtualized hardware resources.

Various commercially available hypervisors may include additional functionality, including software and/or hardware functionality, such as resource management, CPU schedulers, memory schedulers, storage bandwidth allocations, network bandwidth allocations, device drivers, distributed VM file systems, virtual Network Interface Controllers (NICs) and switches, I/O, and so on.

For the purposes of the present discussion, software functionality may be any function, capability, or feature, e.g., stored or arranged data, that is provided via computer code, i.e., software.

The example system 60 includes a host operating system 62 (in a primary domain 90), such as Solaris, Unix, or other, which is suitable for hosting guest virtual machines, including a first VM 68 forming a first domain (VM 1), and a second VM 70 forming a second logical domain (VM2). The VMs 68, 70 host their own respective operating systems 78, 82, which represent guest operating systems of the host operating system 62. The host operating system 60 may run in a host domain 90 (also called a control domain, a primary domain, control VM, or primary VM), while the domains 68, 70 may represent guest domains of the host domain 90.

The host operating system 62 leverages a hypervisor (also called VM Monitor or VM server herein) to facilitate interfacing the hardware resources 20 with the host operating system 62 and accompanying VMs 68, 70, providing functionality to facilitate partitioning of computing resources (which may be virtualized) between the VMs 68, 70 and accompanying operating systems 78, 82, and respective applications 80, 84. Note that in the present example embodiment, the VMs 68, 70 may represent kernel zones. In this case, the host operating system 62 (inside its primary domain 90) may run the workload resource allocator 66 and communicate with a domains manager 76 (via an API 74) to selectively change the binding of the VMs 78, 82, as discussed more fully below.

In the present example embodiment, the first VM 68 is shown utilizing a first set of configurable VM resources 86.

Similarly, the second VM 70 is shown utilizing a second set of configurable VM resources 88.

The example system 60 further includes a workload resource allocator 66 running on the host operating system 62. The workload resource allocator 66 may be similar (in construction and operation) to the on-demand resource allocator 16 of FIG. 1. The workload resource allocator 66 employs software functionality of a bindings API 74 of the host operating system 62 to facilitate binding of workloads to disjoint hardware resources.

The bindings API 74 in turn leverages the domains manager 76 to implement routines provided by the bindings API 74. The domains manager 76 includes functionality for managing the guest VMs 68, 70 and interfacing the bindings API 74 and workload resource allocator 66 to functionality provided by the hypervisor 64.

In an example scenario, the workload resource allocator 66 is configured to work within and across VMs 68, 70 to facilitate allocating computing resources to workloads of a first set of one or more VM applications 80, and a second set of VM applications 84. To implement workload binding to disjoint hardware resources, the workload resource allocator 66 is allowed control over resource allocations for VM applications 80, 84 via resource allocation adjustments that may be made by the hypervisor 64 in response to bindings calculations and based on instructions from the workload resource allocator 66. Note that, in the case of hypervisor-enforced binding, as may be implemented via the system 60 of FIG. 2, resource allocation may involve allocating virtual CPUs (VCPUs inside guest domains) to physical CPUs 86, 88. Conventionally, LDOMs only allow a 1:1 mapping without any overlap between LDOMs and their physical CPUs, such that physical CPUs are partitioned among the LDOMs. Such partitioning may be done upfront, although LDOMs may also allow for dynamic reconfiguration during runtime. LDOMs may support strong bindings. Those skilled in the art will appreciate that in a SPARC/Solaris system implementation, Kernel Zones (KZs) may facilitate floating or dynamic CPU resource allocations to VMs (corresponding to the KZs).

Figure 3:
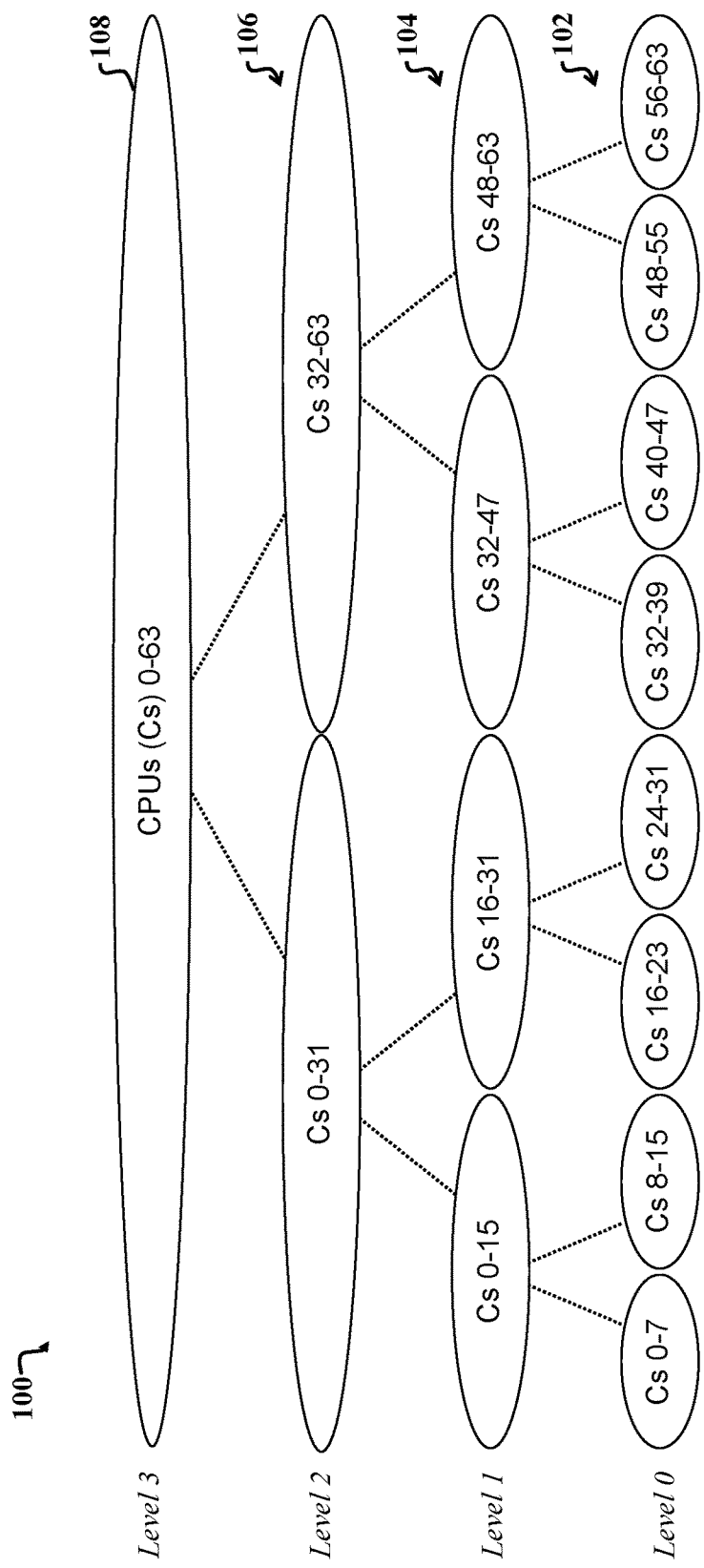
FIG. 3 illustrates a first example generalized hierarchical hardware resource topology usable by the systems of FIGS. 1-2.

FIG. 3 illustrates a first example generalized hierarchical hardware resource topology 100 usable by the systems 10, 60 of FIGS. 1-2. The example topology 100 includes sixty-four CPUs (also abbreviated "Cs" for CPU Cores), also called CPU cores or processors herein, in a four level (level 0-through level 3) hierarchical topology 100.

A lowest topology level (level 0) includes so-called leaf Processor Groups (PGs) or leaf locality groups 102, which represent groupings of eight CPUs. Each group of 8 CPUs share lowest-level CPU resources, e.g., Translation Lookaside Buffers (TLBs), integer and/or floating point pipelines, and so on. At the lowest level, i.e., level 0 (also called the zeroth level), the different leaf PGs 102 do not share zeroth level resources, e.g., caches, pipelines, etc. with other leaf PGs in level 0. Accordingly, they represent disjunct or disjoint resources.

At the next higher level, e.g., level 1, the level 1 processor groups 104 include sub-groups of leaf PGs 102, wherein the level 1 PGs or locality groups 104 include leaf PGs that share level 1 hardware resources, such as level 1 cache, level 1 pipelines, etc. For example, a first level 1 processor group (Cs 0-15) includes the subgroups of leaf PGs, including a leaf PG containing CPUs 0-7 and a second leaf PG containing CPUs 8-15.

Similarly, level 2 PGs 106 include sub-groups of the next lower level PGs 104, where the level 1 sub-group PGs share the same level 2 hardware resources, e.g., level 2 cache, pipelines, and so on.

Similarly, a level 3 PG 108 includes sub-groups (i.e., groups Cs 0-31 and Cs 32-63) of level 2 PGs, where the level 2 sub-groups 106 share the same level 3 resources, e.g., level 3 cache, pipeline, memory controller, power management unit, etc. The PG 108 containing the CPUs 0-63 is called a root PG.

Note that at each level (level 0 through level 3), PGs are considered disjoint, as they do not share computing resources at that level. The terms processor group and locality group (lgroup) may be employed interchangeably herein when referring to groups of CPUs at a given level of a hierarchical hardware resource topology, e.g., the topology 100. Nevertheless, the term locality group may sometimes be preferentially used to refer to NUMA nodes at higher levels of a hardware resource topology, where each node illustrated in the topology represents a CPU socket, i.e., a chip that plugs into a motherboard or other hardware unit.

In the hardware topology 100, the root PG 108 may refer to processors within a given socket, which may represent a NUMA node. Several of the hardware topologies may be included in a larger hierarchy characterizing a set of available system hardware resources. Similarly, a given system need not include an extensive hierarchical topology and may, for example, just include a single set of 8 CPU cores, e.g., one of the leaf PGs 102.

Figure 4:
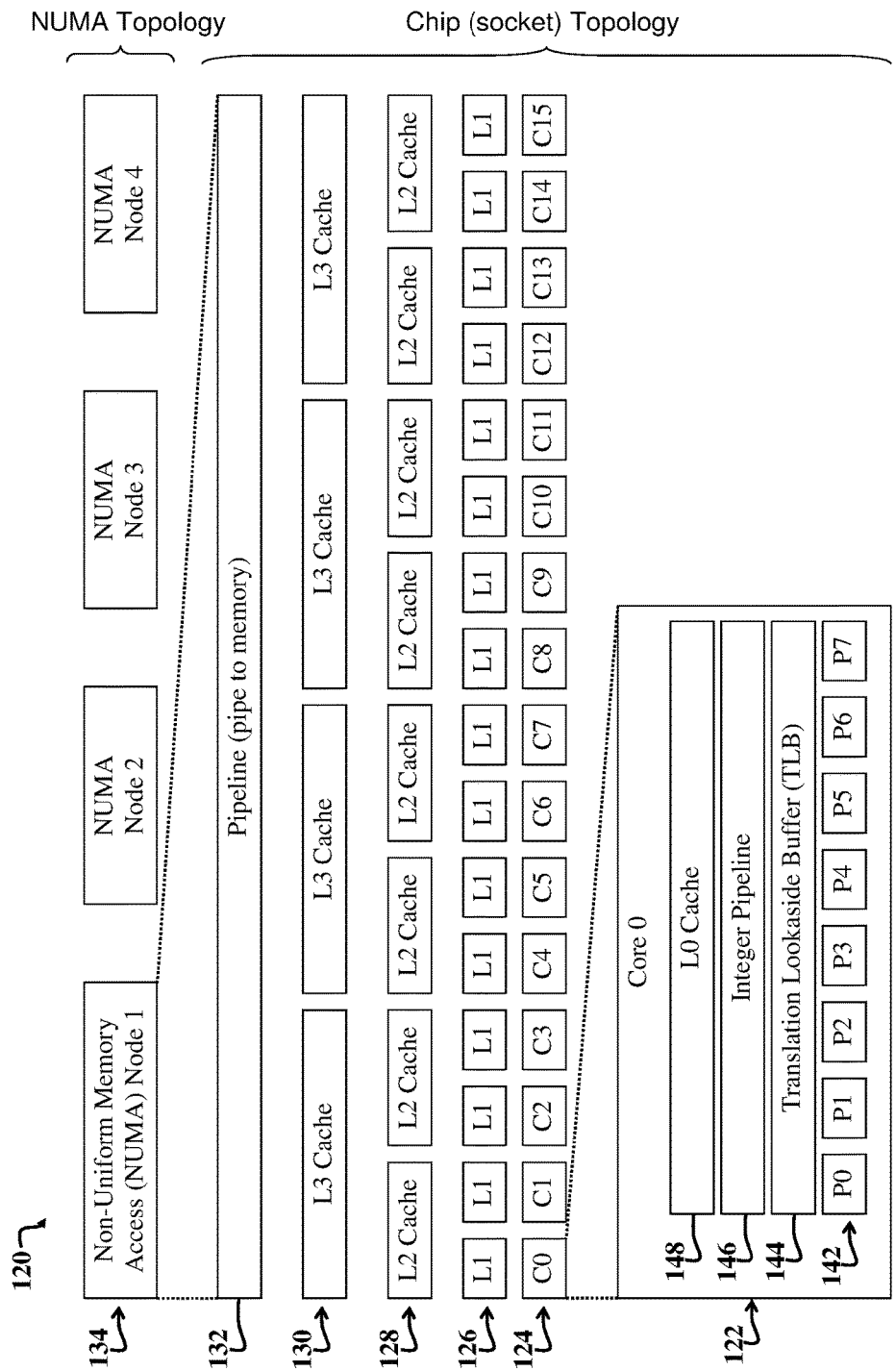
FIG. 4 illustrates a second example hierarchical hardware resource topology or architecture.

FIG. 4 illustrates a second example hierarchical hardware resource topology 120 or architecture. At a highest level 134 of the second topology 120, hardware resources (and/or virtualized hardware resources) are grouped into four NUMA nodes, where each of the NUMA nodes corresponds to a CPU socket. The computing system characterized by the topology 120 is called a four-socket system.

The four-socket topology 120 includes sixteen cores 124, where each core (as illustrated in an example core 122) can handle eight separate threads 142, one for each sub-processor (P0-P7) of the core. Within a given CPU core (e.g., core 0, abbreviated "C0"), sub-processors 142 may access a TLB 144, an integer pipeline 146, and a level 0 cache 148.

Within a given socket, e.g., within a first NUMA node hardware resources 122-132 exhibit hierarchical relationships, such that a lower level component uses resources above it. For example, each level 1 core 124 (i.e., cores C0-C15) uses corresponding level 1 cache units 126. At the next level, pairs of CPU cores share level 2 cache units 128. Similarly, at the next higher level, groups of cores share level 3 cache units 130. Four level 3 cache units are shared by four corresponding PGs that each include four cores. Similarly, at a next higher level, hardware resources share a pipe to memory, e.g., a processor pipeline 132.

The hardware topology within a given NUMA node may be called a chip topology or a socket topology. Similarly, topologies illustrating arrangements of sockets or root PGs may be called a NUMA topology.

Figure 5A:
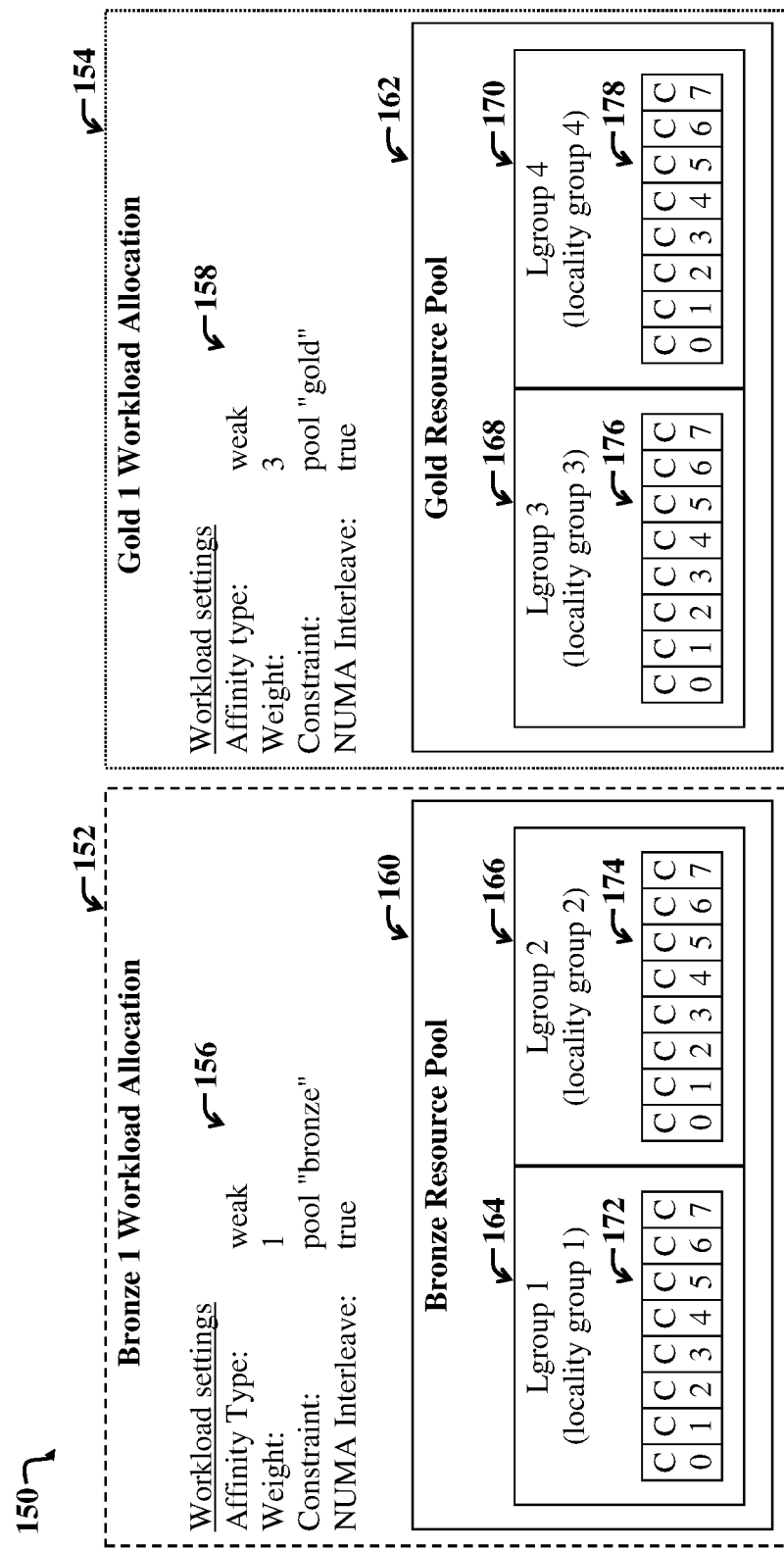
FIG. 5A illustrates a first example resource allocation for two competing workloads having different workload constraint and weight settings in a system that includes four locality groups comprising two resource pools.

FIG. 5A illustrates a first example resource allocation 150 for two competing workloads 152, 154 having different workload constraint and weight settings in a system that includes four PGs, i.e., locality groups (called lgroups), comprising two resource pools.

A first workload hardware resource allocation 152 is called a bronze workload allocation. Similarly a second resource allocation 154 is called a gold workload allocation. The exact names of workloads may vary. The names "bronze" and "gold" are merely chosen to reflect relative priorities of the workloads, which are specified by workload weight settings (among the settings 156, 158).

For example the bronze workload allocation 152 exhibits a weight of 1, whereas the gold workload allocation exhibits a weight of 3, such that the gold workload allocation 154 will be given higher resource allocation priority than the bronze workload when the bronze and gold workloads share the same constraint, i.e., when they share the same set of CPU resources indicated by the constraint. The constraint specifies a predefined resource pool, as discussed more fully below.

Each workload 152, 154 are associated with different workload settings 156, 158, called workload properties. For example the bronze workload allocation 152 is characterized by the following workload property settings 156:
  affinity type=weak,
  workload weight=1,
  constraint=pool "bronze", and
  NUMA interleave=true.

The gold workload allocation 154 includes the following workload property settings 158:
  affinity type=weak,
  weight=3,
  constraint=pool "gold", and
  NUMA interleave=true.

Accordingly, the bronze resource allocation 152 is confined to a bronze resource pool 160 in accordance with the bronze pool constraint setting indicated among the bronze workload property settings 156. Similarly, the gold resource allocation 154 is confined to a gold resource pool 162 in accordance with the gold pool constraint setting indicated among the gold workload property settings 158.

The bronze resource pool 160 has been predefined to include a first lgroup 164 and a second lgroup 166. The first lgroup 164 includes eight cores 172. Similarly, the second lgroup includes eight cores.

Similarly, the gold resource pool 162 includes a third lgroup 168 and a fourth lgroup 170, which include a third set of eight cores 176 and a fourth set of eight cores 178, respectively.

Note that since the NUMA interleave property setting of each workload allocation 152, 154 is set to true, resource allocations of each workload 152, 154 are interleaved between lgroups of their respective resource pools 160, 162. Accordingly, the bronze workload allocation 152 is preferentially allocated to both first and second lgroups 164, 166, such that resources of the lgroups 164, 166 are shared or used by the associated bronze workload. Similarly, the gold workload allocation is interleaved or spread between the third and fourth lgroups 168, 170 of the gold resource pool 162.

Figure 5B:
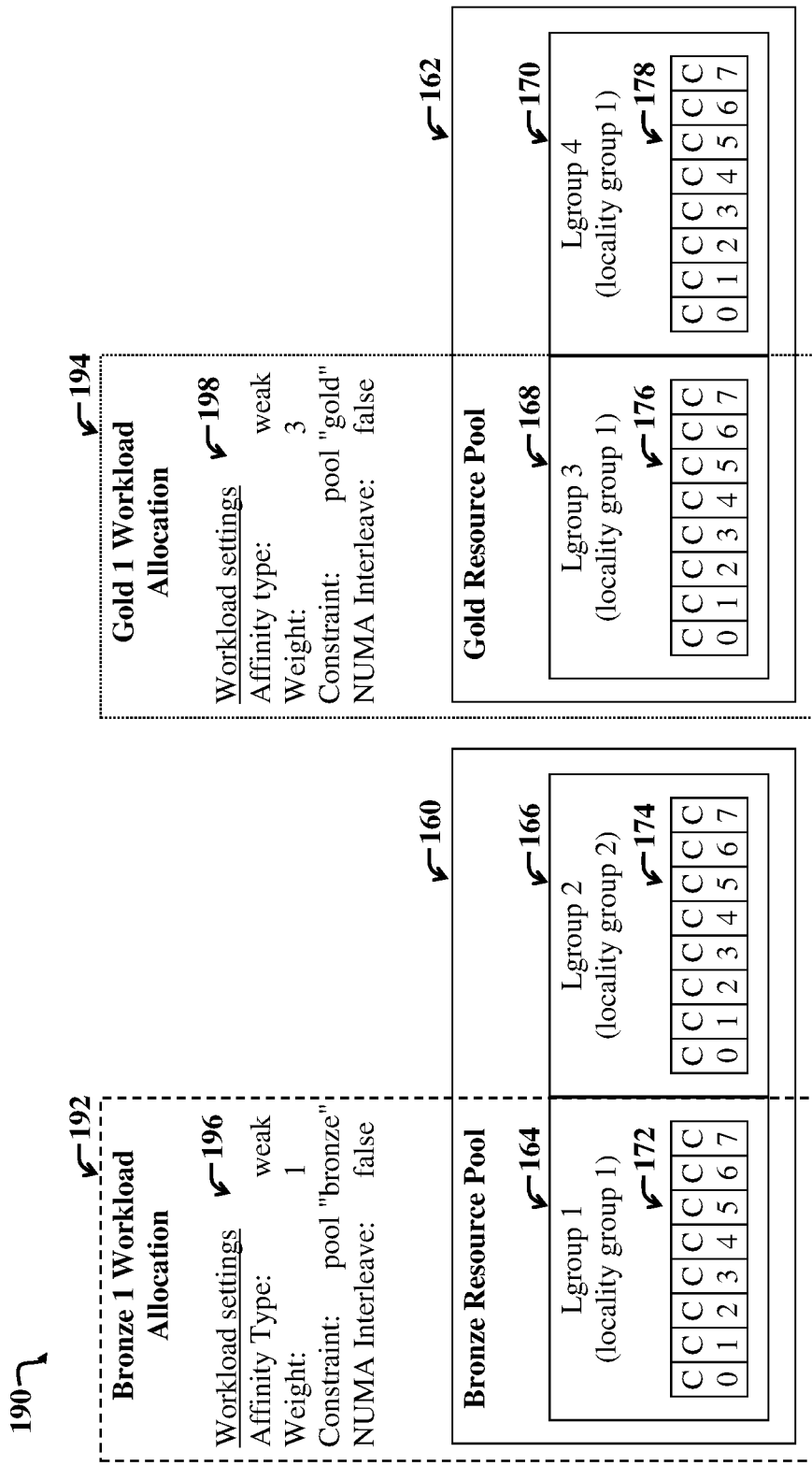
FIG. 5B illustrates a second example resource allocation representing the resource allocation of FIG. 5A after workload interleave settings are set to off.

FIG. 5B illustrates a second example resource allocation 190 representing the resource allocation 150 of FIG. 5A after workload NUMA interleave settings are set to off, i.e., false.

Note that upon switching of the NUMA interleave settings from true to false, a resulting updated bronze workload hardware resource allocation 192 is preferentially allocated to one lgroup, e.g., the first lgroup 164 of the bronze resource pool 160, in accordance with updated bronze workload property settings 196.

Similarly, the resulting updated gold workload hardware resource allocation 194 is now preferentially allocated (not interleaved) to one lgroup, e.g., the third lgroup 168 of the gold resource pool 162, in accordance with updated gold workload property settings 198.

Note that the affinity type of each workload allocation 192, 194 is set to weak. Accordingly, threads of the bronze and/or gold workload, which are preferentially allocated to one lgroup each, may migrate off the preferred lgroups (e.g., groups 164 and 168, respectively) and use the adjacent lgroups (i.e., lgroups 166 and 170, respectively) within the allocated pools (i.e., pools 160 and 162 respectively) as needed to meet changing workload demands.

Figure 6A:
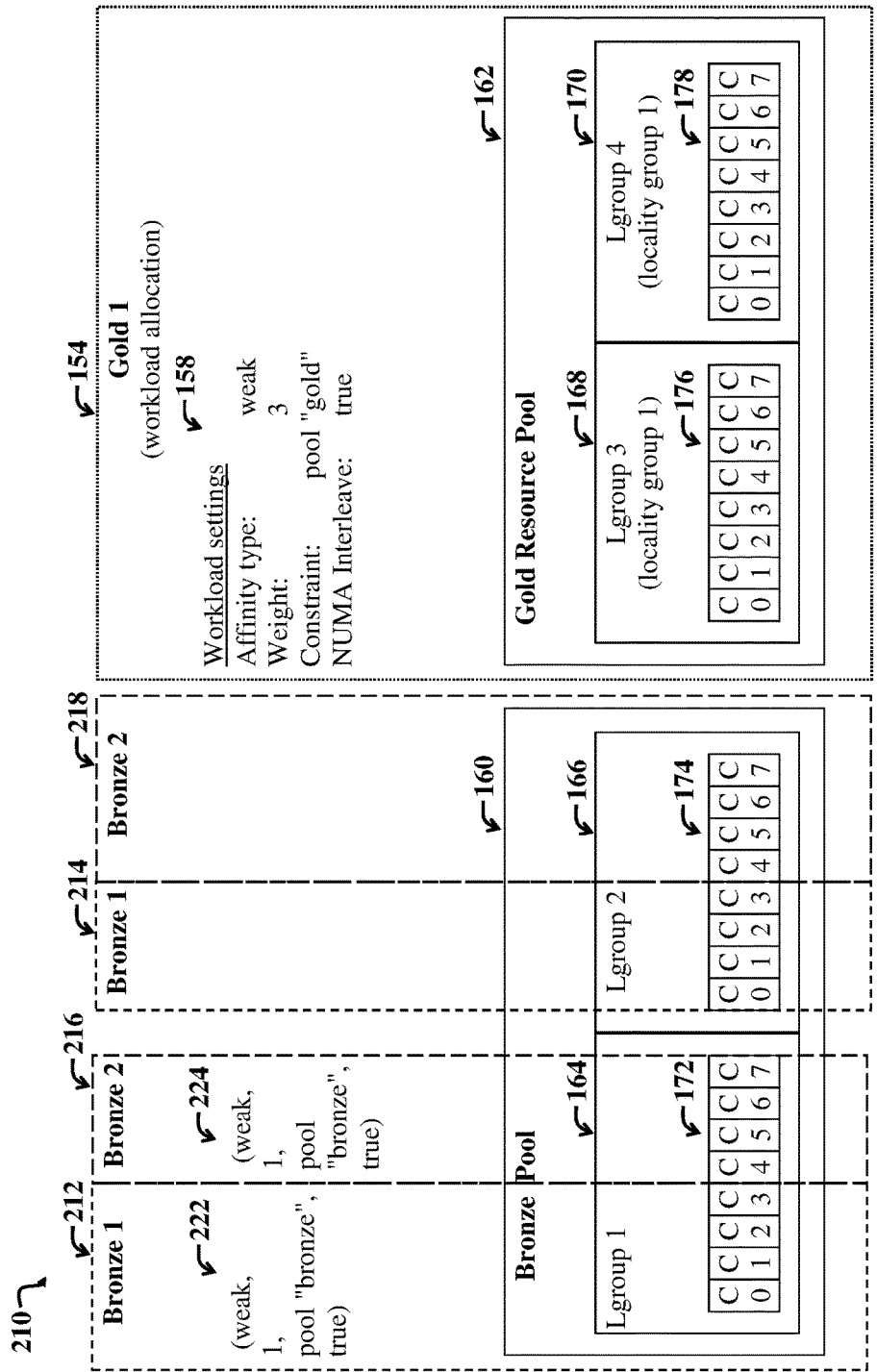
FIG. 6A illustrates a third example resource allocation representing the resource allocation of FIG. 5A after a new competing workload has been added to the first resource pool, as specified by the constraint setting of the newly added workload.

FIG. 6A illustrates a third example resource allocation 210 representing the resource allocation 150 of FIG. 5A after a new competing workload (i.e., a second bronze workload corresponding to allocations 216, 218) has been added to the first resource pool 160 (i.e., bronze pool) as specified by the constraint setting (indicated among workload property settings 224 for the second bronze workload 216, 218) of the newly added bronze workload (called the bronze 2 workload).

Note that the gold workload resource allocation 154 remains unchanged, as the newly added bronze workload 216, 218 is confined to the bronze resource pool 160 in accordance with the bronze 2 workload property settings 224.

When the second bronze workload 216, 218 is added to the system, the bronze workload allocation 152 of FIG. 5A is dynamically, i.e., automatically, adjusted (e.g., by the workload resource allocator 16 of FIG. 1 or 66 of FIG. 2) to accommodate the new workload in accordance with individual workload property settings 222, 224.

Note that the first bronze workload allocation 152 of FIG. 5A is now adjusted (resulting in a new bronze workload allocation 212, 214), such that the first bronze workload is now interleaved across both the first and second lgroups 164, 166 of the bronze pool in proportion to its relative weight (e.g., relative to the proportion of the weight of the bronze workload 212, 214, relative to the total weight of all workloads allocated to the bronze pool 160).

Since the first bronze workload 212, 214 and the second bronze workload 216, 218 each have a similar weight (i.e., a weight of 1), as indicated in their respective property settings 222, 224, both workloads evenly share hardware resources of the bronze pool 160. Furthermore, since the NUMA interleave settings are true, resources allocated to the first bronze workload 212, 214 and the second bronze workload 216, 218 are interleaved or spread evenly across the first lgroup 164 and the second lgroup 166 of the bronze pool 160 to which both workloads are confined (as indicted by their respective constraint settings).

Figure 6B:
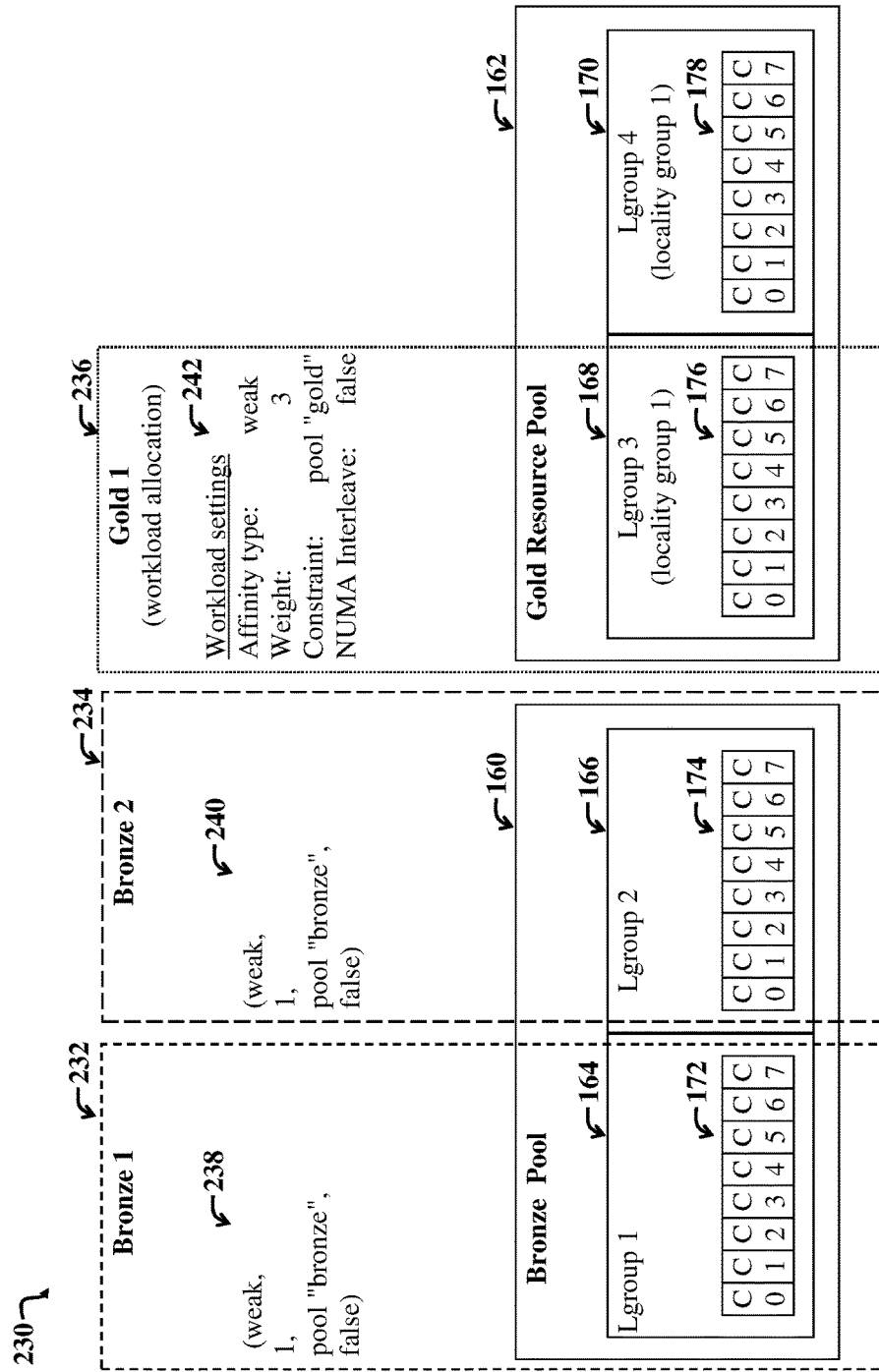
FIG. 6B illustrates a fourth example resource allocation representing the resource allocation of FIG. 6A after workload interleave settings are set to off, i.e., false.

FIG. 6B illustrates a fourth example resource allocation 230 representing the resource allocation 210 of FIG. 6A after workload NUMA interleave property settings are set to off, i.e., set to false.

Changing of the NUMA interleave settings results in an automatic updated resource allocation, including an updated first bronze workload allocation 232 and an updated second bronze workload allocation 234. Changes in the respective NUMA interleave property settings are indicated by updated workload property settings 238, 240 for the first bronze workload allocation 232 and the second bronze workload allocation 234, respectively.

Turning off the NUMA interleave settings for the bronze resource pools results in the updated first bronze workload allocation 232 and the updated second bronze workload allocation 234 not being interleaved across lgroups 164, 166 of the bronze pool 160. Instead, the bronze workload allocations 232, 234 are confined to particular lgroups, i.e., the first lgroup 164, and the second lgroup 166, respectively.

Note that the gold resource allocation 154 of FIG. 6A is also automatically adjusted (resulting in an updated gold resource allocation 236) to reflect a NUMA interleave property setting of false (shown in the gold workload property setting 242). Since the NUMA interleave property setting for the updated gold resource allocation 236 is turned off (i.e., set to false), the updated gold workload allocation 236 is bound to one lgroup (e.g., the third lgroup 168) of the gold resource pool 162.

Furthermore, note that since various affinity settings for the workload allocations 232-236 are set to weak, threads of the different workload allocations may migrate off of their preferentially allocated lgroups 164-168 to use resources of adjacent lgroups within the same resource pool as needed depending upon changing workload demands.

Figure 7A:
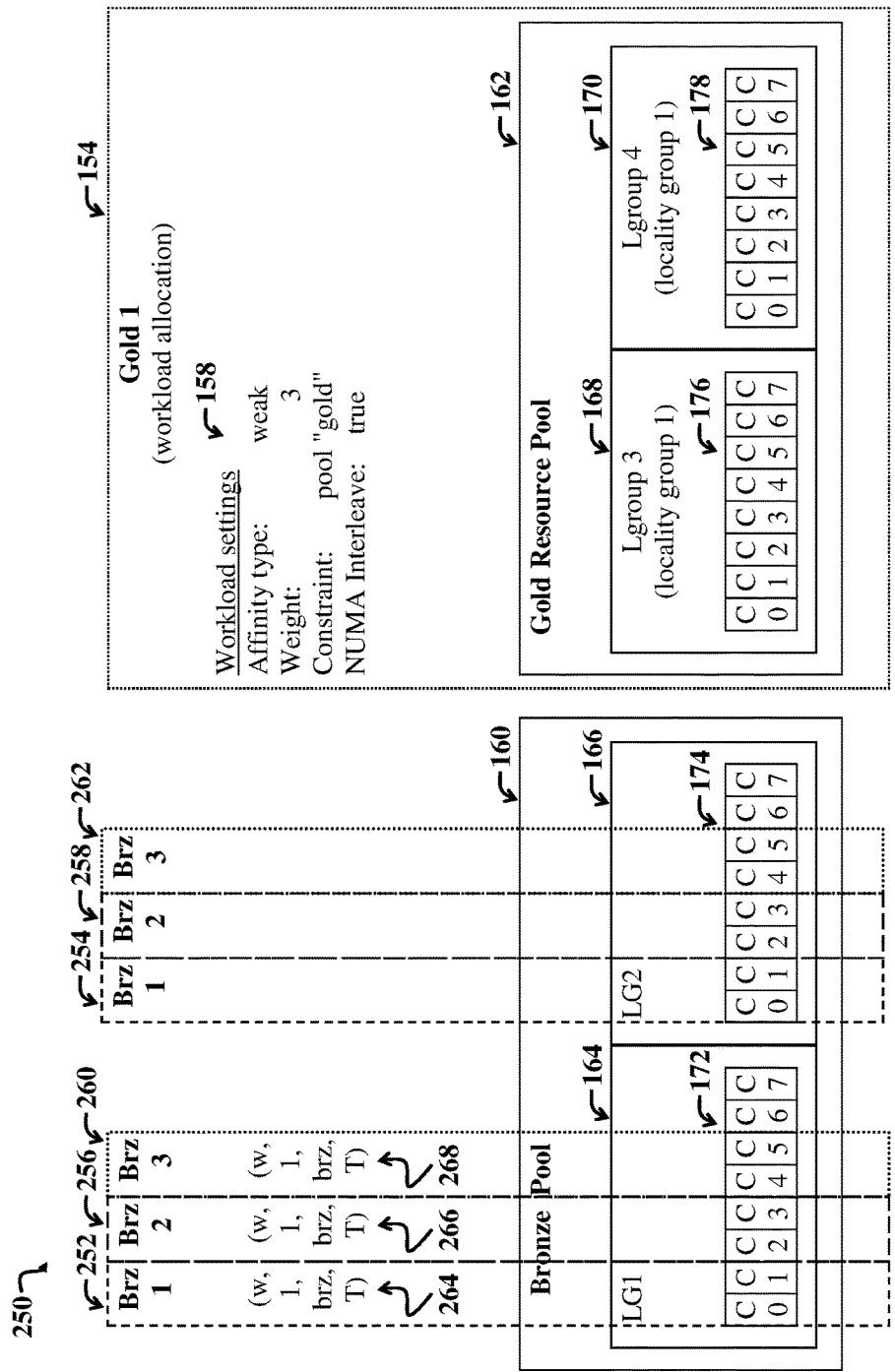
FIG. 7A illustrates a fifth example resource allocation representing the resource allocation of FIG. 6A after a new competing workload has been added to the first resource pool, where workload affinity settings allow some thread migration within locality groups of the first resource pool.

FIG. 7A illustrates a fifth example resource allocation 250, which represents the resource allocation 210 of FIG. 6A after a new competing workload (a bronze 3 workload) has been added to the first resource pool 160, where workload affinity settings allow some thread migration within locality groups of the first resource pool 160.

With reference to FIGS. 6A and 7A, the first bronze workload allocation 212, 214 and the second bronze workload allocation 216, 218 of FIG. 6A are adjusted to accommodate a third bronze workload with the same workload property settings, e.g., as indicated by settings 264-268 in FIG. 7A. A resulting updated first bronze workload resource allocation 252, 254 and an updated second bronze workload resource allocation 256, 258 are automatically adjusted to accommodate a third bronze resource allocation 260, 262.

Note that the bronze workload allocations 252-262 are each only allocated two of eight cores on each lgroup 164, 166 of the bronze resource pool 160, i.e., 25% of the available resources. This is because each workload has a weight of 1, and the total combined weight of all of the bronze workloads is 3. In this case, each workload, when proportionally allocated resources by weight proportion, would be assigned one third of the resources of the bronze pool 160 if the CPUs could be divided in thirds. However, since the lgroups 164, 166 have eight cores each, dividing eight cores by a third leaves a fraction. Accordingly, in the present example, CPU allocations are broken down into the next lower percentage (i.e., 25%) of resources that would not result in fractional assignment of CPU cores to workloads.

The bronze workload allocations 252-262 leave two cores in each lgroup 164, 166 unallocated. Nevertheless, the unallocated cores (cores 6 and 7 of the lgroups 164, 166) may still be shared by the three bronze workloads and associated allocations 252-262 on an as needed basis, since the workload affinity property settings for the workloads are set to weak (w), as indicated in the workload resource property settings 264-268.

Note that the gold resource allocation 154 does not change, as the constraint property setting characterizing the gold resource allocation 154 is set to a different resource pool, i.e., the gold resource pool, and interleave settings have not been adjusted or changed, and no new workloads have been allotted to use the gold resource pool 162. If a new workload is added to the gold resource pool 162, e.g., via instantiation of a software application or process characterized by a constraint property setting indicating the gold resource pool 162, then the gold resource allocation 154 will dynamically update to use resources of the gold resource pool 162 in proportion to the relative weights of the workloads to be allotted resources from the gold resource pool 162.

Tests with database workloads using Solaris and accompanying SPARC computing resources have shown substantially improved response times for resource allocations in accordance with embodiments discussed herein, as compared to conventional resource allocation mechanisms that do not employ MCB in accordance with embodiments discussed herein.

In one test, the test platform included a computing system with four sockets. Two sockets were assigned to a bronze category, and the two remaining sockets are assigned to a gold category. Four identical OnLine Transaction Processing (OLTP) database instances provided workloads to be allocated. Three of the database instances provided workloads (bronze tenants) that were constrained to use the bronze resource pool. The workload that was considered critical (gold tenant) was maintained at a steady transaction rate, while the transaction rates of the other workloads (bronze tenants) were increased from zero until the system was saturated. The gold workload was assigned a weight of 3 (corresponding to a number of allocated CPU shares), and the bronze workloads were each assigned a weight of 1 (i.e., assigned 1 CPU share).

MCB binding in accordance with embodiments discussed herein resulted in response time reductions for the gold workload by a factor two to twenty (depending upon workload property settings, e.g., weak or strong affinity settings), thereby demonstrating substantial reductions in performance interference of the bronze workloads on the gold workloads. Similar reductions in response times and reductions in mutual workload performance interference degradation were achieved using other resource configurations.

Figure 7B:
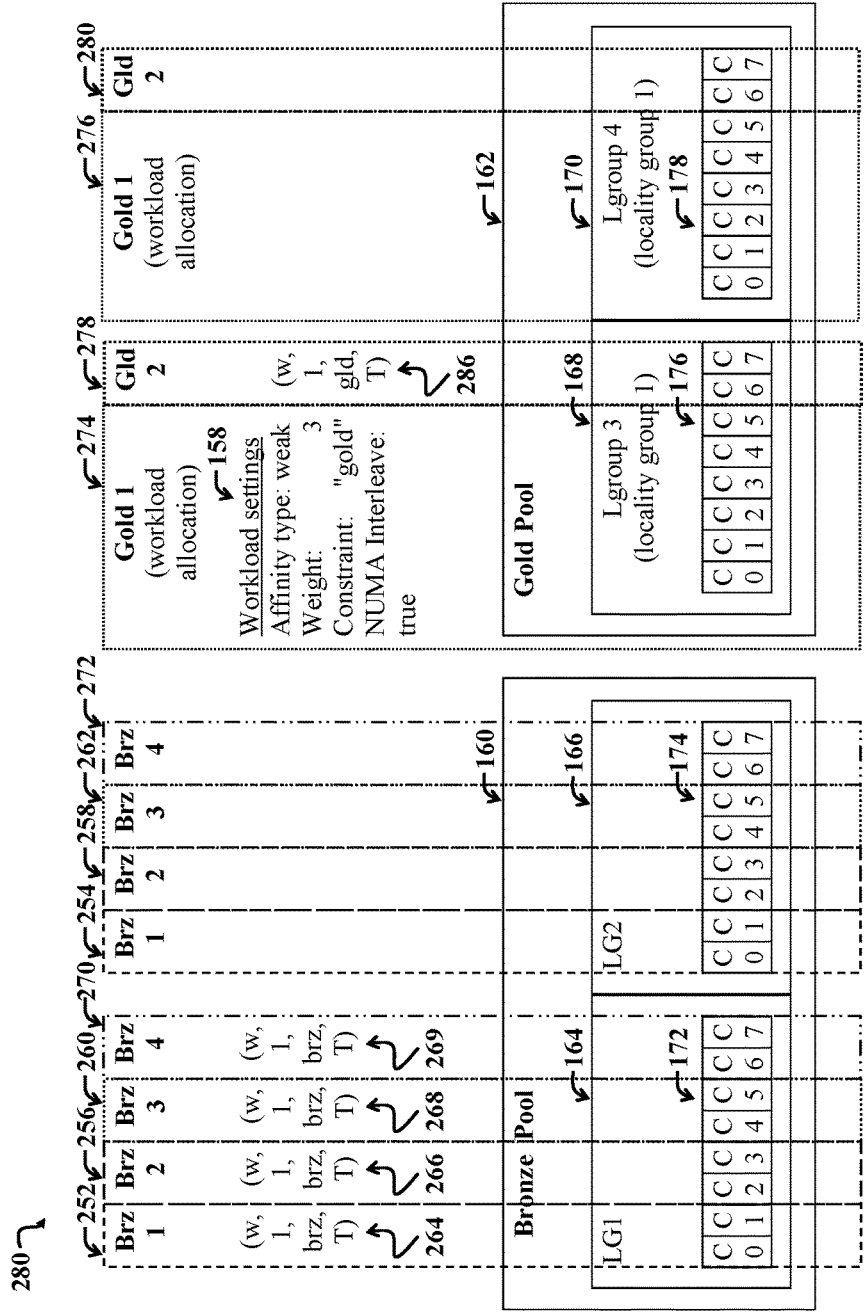
FIG. 7B illustrates a sixth example resource allocation after a fourth workload is allocated to the first resource pool, and after a second workload is added to the second resource pool.

FIG. 7B illustrates a sixth example resource allocation 280 after a fourth workload (bronze 4 workload) is allocated to the first resource pool 160, and after a second workload (gold 2) is added to the second resource pool 162.

With reference to FIGS. 7A and 7B, the resource allocations 252-262 for the first three bronze workloads need not change to accommodate a fourth bronze workload 270, 272 with the same workload property settings 269. The fourth workload allocation 270, 272 may be allocated previously unallocated cores in the bronze resource pool 160. Since each of the four bronze workload are weighted evenly (all having weights of 1), each bronze workload allocation will include 25% of available hardware resources in the bronze pool 160, which includes an allotment of two cores among the bronze pool 160 for each workload allocation.

Furthermore, since each NUMA interleave property setting is set to true (i.e., is on), the bronze workload allocations 252-262, 270, 272 are interleaved or spread among both lgroups 164, 166 of the bronze pool 160.

Regarding the gold pool 162, a second gold workload is allocated second gold resource allocation 278, 280. The first gold resource allocation 154 of FIG. 7A is dynamically updated to accommodate the second gold resource allocation 278, 280, resulting in an updated first gold resource allocation 274, 276.

Note that the updated first gold resource allocation 274, 276 is in accordance with associated workload property settings 158, which indicate a weighting of 3. Workload property settings 286 for the second gold resource allocation 278, 280 indicate a weighting of 1. Accordingly, first gold resource allocation 274, 276 includes 75% of the resources of the gold pool 162, while the second gold resource allocation is allocated the remaining 25% of the gold pool resources 162. Note that such resource allocations 274-280 are in amounts proportional to the weights of the workload settings 158, 286.

Furthermore, note that since the NUMA interleave property settings for the gold workload resource allocations 274-280 are set to true, the resource allocations 274-280 are interleaved between lgroups 168, 170 of the gold resource pool 162.

Figure 8:
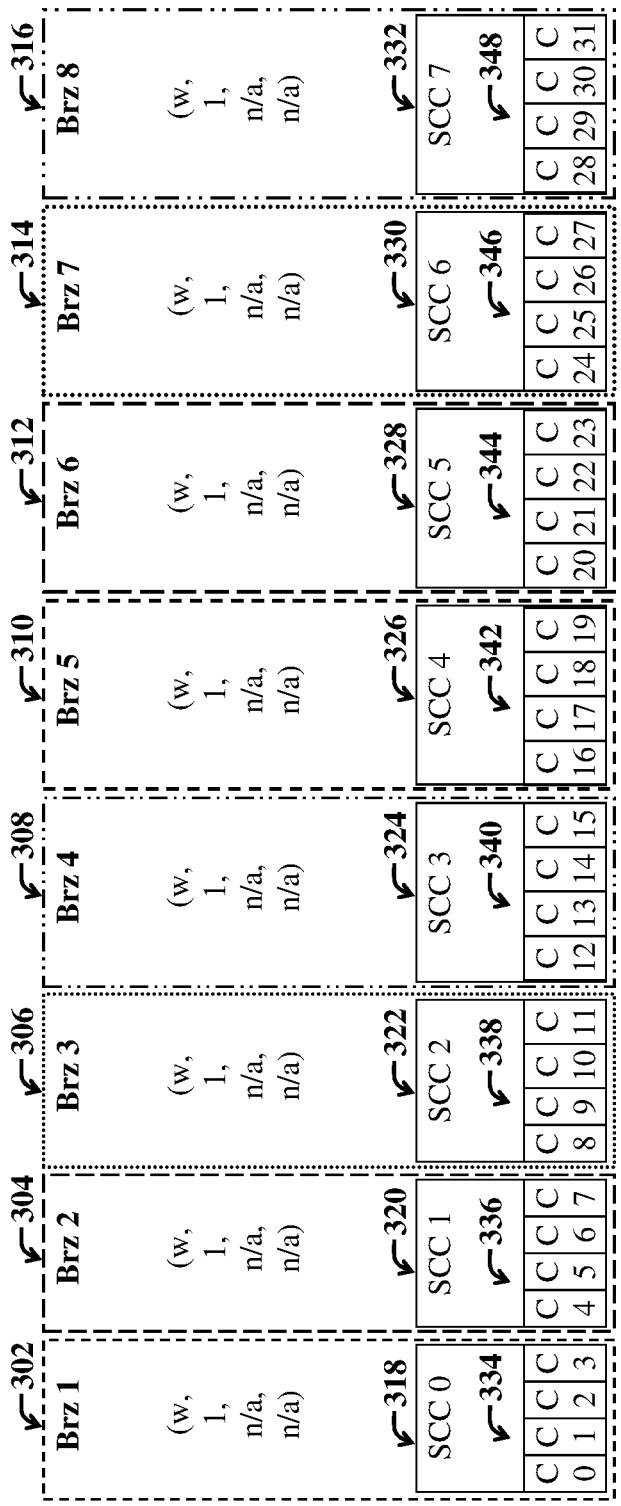
FIG. 8 illustrates a seventh example resource allocation for eight equally weighted competing workloads in a system that includes eight locality groups (each forming shared computing clusters) and eight resource pools.

FIG. 8 illustrates a seventh example resource allocation 300 for eight equally weighted competing workloads 302-316 in a system that includes eight locality groups 318-332 (each forming shared computing clusters (SCCs)) and eight resource pools corresponding to the locality groups 318-332. Each of the eight locality groups 318-332 include respective sets of four CPU cores 334-348.

All of the workload resource allocations are characterized by similar settings, including affinity property settings (set to weak) and weights (each set to 1). Workload constraint settings and NUMA interleave settings are not needed or otherwise not used in the example allocation 300 of FIG. 8, which represent an allocation for a different resource topology than used for the examples of FIGS. 5A-7B. Accordingly, since the resource allocations 302-316 have similar workload property settings (including weights), the workloads 302-316 are evenly allocated available resources. Furthermore, since no constraint setting is specified, the allocations 302-316 span resources 318-332 of the associated system, i.e., computer or collection of computers.

Note that in general, depending upon the needs of a given implementation, more, fewer, or different types of properties may be associated with a workload and used for resource allocations, without departing from the scope of the present teachings.

The following examples may be derived using computer code based on the pseudo code provided above. The following twenty examples, the bindings are generated for workloads on an M7-like processor topology, which includes thirty-two leaf PGs (cores), sixteen level 2 cache PGs (with 2 cores each), eight SSC PGs (single core clusters of four cores each), and one root PG. Workload weights are chosen randomly between 1-5 for each workload.

In the output below, each workload is represented by a letter, and the horizontal position of the letter corresponds to the core(s) that the workload is bound to. There are thirty-two horizontal positions, corresponding with the thirty-two leaf cores. In case one or more of the cores supports two workloads, an output has two lines of thirty-two positions each, where each of the lines identifies one of the sharing workloads. The space after every 4 cores represents SCC boundaries. In the header line, the values in brackets represent the individual workload weights:
1 workloads (3):
AAAA AAAA AAAA AAAA AAAA AAAA AAAA AAAA
2 workloads (1, 4):
AAAA BBBB BBBB BBBB BBBB BBBB BBBB - - -
3 workloads (3, 3, 5):
AAAA AAAA BBBB BBBB CCCC CCCC CCCC CC - - -
4 workloads (1, 2, 2, 2):
AAAA BBBB BBBB CCCC CCCC DDDD DDDD - - -
5 workloads (2, 3, 3, 4, 5):
AAAB BBBB CCCC CDDD DDDD EEEE EEEE E - - -
6 workloads (2, 2, 2, 2, 2, 4):
AAAA BBBB CCCC DDDD EEEE FFFF FFFF - - -
7 workloads (1, 1, 2, 3, 4, 4, 5):
ABCC CDDD DEEE EEEF FFFF FGGG GGGG G - - -
8 workloads (1, 1, 3, 3, 4, 4, 5, 5):
ABCC CDDD EEEE FFFF GGGG GGHH HHHH - - -
9 workloads (1, 1, 1, 1, 3, 4, 4, 5, 5):
ABCD EEEF FFFF GGGG GHHH HHH I - - -
10 workloads (1, 1, 2, 2, 2, 3, 3, 4, 4, 5):
ABCC DDEE FFFG GGHH HHII IJJJ JJJ - - -
11 workloads (1, 1, 2, 2, 2, 2, 3, 3, 4, 5, 5):
ABCC DDEE FFGG GHHH IIII JJJJ JKKK KK - - -
12 workloads (1, 1, 2, 2, 2, 2, 3, 3, 4, 4, 4, 5):
ABCC DDEE FFGG GHHH IIII JJJJ KKKK LLLL
13 workloads (1, 1, 2, 3, 3, 4, 4, 4, 5, 5, 5, 5, 5):
ABCC DDDE EEFF FFGG GGHH HHII IIIJ JJJJ KKKK KKKK KKLL LLLL LLLL MMMM MMMM MM - - -
14 workloads (1, 1, 1, 2, 2, 2, 3, 3, 3, 4, 4, 4, 5, 5):
ABCD DEEF FGGG HHHI IIJJ JJKK KKLL LLMM NNNN NNNN NNNN NNNN NNNN NNNN NNNN NNNN
15 workloads (1, 1, 2, 3, 3, 3, 3, 4, 4, 5, 5, 5, 5, 5, 5):
ABCC DDDE EEFF FGGG HHHH IIII JJJJ JKKK LLLL LLLL MMMM MMMM NNNN NNNN OOOO OOOO
16 workloads (1, 1, 2, 3, 3, 3, 3, 3, 4, 4, 4, 4, 5, 5, 5, 5):
ABCC DDDE EEFF FGGG HHHI IIIJ JJJK KKKL MMMM MMMM NNNN NNNN OOOO OOOO PPPP PPPP
17 workloads (1, 1, 1, 1, 1, 1, 2, 2, 2, 3, 3, 3, 3, 4, 4, 4, 5):
ABCD EFGG HHII JJJK KKLL LMMM NNNN OOOO PPPP PPPP PPPP PPQQ QQQQ QQQQ QQQQ QQ - - -
18 workloads (1, 1, 2, 2, 3, 3, 3, 3, 3, 3, 3, 4, 5, 5, 5, 5, 5):
ABCC DDEE EFFF GGGH HHII IJJJ KKKL LLLM NNNN NNOO OOOO PPPP PPQQ QQQQ RRRR RR - - -
19 workloads (1, 1, 2, 2, 2, 2, 3, 3, 3, 3, 3, 3, 4, 4, 4, 4, 4, 5, 5):
ABCC DDEE FFGG GHHH IIIJ JJKK KLLL MMMM NNNN OOOO PPPP QQQQ RRRR RRSS SSSS - - -
20 workloads (1, 1, 1, 1, 1, 1, 1, 3, 3, 3, 3, 4, 4, 4, 4, 5, 5, 5, 5, 5):
ABCD EFGH HHII IJJJ KKKL LLLM MMMN NNNO PPPP PPQQ QQQQ RRRR RRSS SSSS TTTT TT - - -

Figure 9:
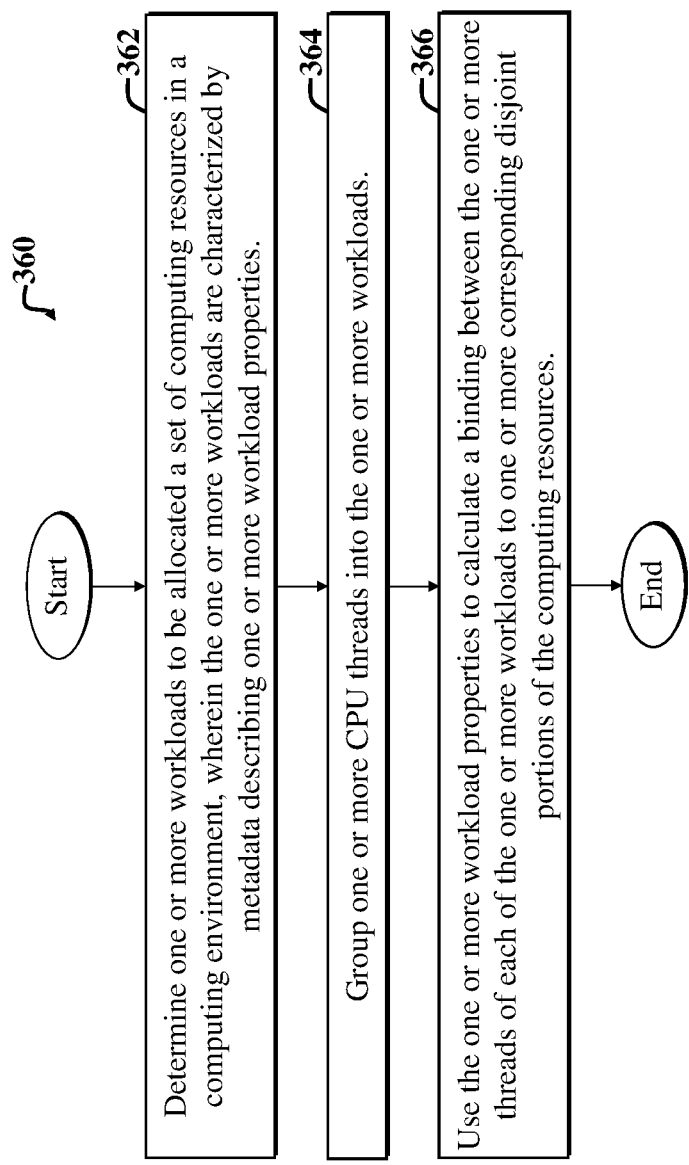
FIG. 9 is a flow diagram of a first example method suitable for use with the embodiments of FIGS. 1-8.

FIG. 9 is a flow diagram of a first example method 360 suitable for use with the embodiments of FIGS. 1-8. The example method 360 facilitates allocating resources in a computing environment, such as a multiprocessing enterprise computing environment.

The first example method 360 includes an initial workload determining step 362, which involves determining one or more workloads to be allocated a set of computing resources in a computing environment, such as the computing environment characterizing or representing the systems 10 and/or 60 of FIGS. 1 and 2, respectively.

The one or more workloads are characterized by metadata describing one or more workload properties (also called workload settings herein). Each of the one or more workloads is associated with or otherwise defines one or more CPU threads (also simply called threads herein).

Next, a grouping step 364 step includes grouping or collecting the one or more CPU threads into the one or more workloads in preparation for applying configurable properties or settings thereto.

Finally, a binding step 366 includes using the one or more workload properties to calculate a binding between the one or more threads of each of the one or more workloads and one or more corresponding portions of the computing resources. The portions of computing resources may represent disjoint processor groups, lgroups, etc.

Note that the method 360 may be modified, e.g., augmented, replaced, etc., without departing from the scope of the present teachings. For example, the grouping step 364 may be omitted or may otherwise be considered to have been performed in the first workload determining step 362, without departing from the scope of the present teachings.

Furthermore, the first example method 360 may be modified to state that each of the one or more workloads are associated with a particular software application. Each particular software application may include, for example, an instance of a software application, such as a database or a pluggable database (PDB) that plugs into a container database.

The first example method 360 may further specify that the one or more corresponding portions of the computing resources includes computing resources that are related in accordance with a hierarchy characterizing a hardware resource topology.

The hierarchy may include a hierarchy of CPUs and associated processing and memory resources, e.g., as illustrated in FIGS. 3-8. The processing and memory resources include computer cache. At a lowest level of the hierarchy, the one or more corresponding portions of the computing resources may include one or more CPU shares of one or more CPU cores.

The one or more workload properties may include a workload weight. The first example method 360 may be further altered to specify a step of using the workload weight to allocate computing resources of a group of computing resources to each of the one or more workloads.

The first example method 360 may further include allocating the computing resources within the group of computing resources to a particular workload in proportion to the ratio of the workload weight to the sum total of workload weights of all workloads to be allocated resources from among the group of computing resources.

The one or more workload properties may include a specification (called a workload constraint) of a particular group of computing resources available for assignment to the one or more workloads. The workload constraint property may identify a CPU set, which may include one or more lgroups and/or collections or lists thereof.

Each group of computing resources that is identified by the workload constraint includes both computer processing resources and memory resources associated with the computer processing resources at a particular level of a hierarchy of computing resources.

The hierarchy may include, at a lowest level, one or more leaf processor groups. Each of the leaf processor groups may include a set of one or more CPU cores that share a lowest level cache, e.g., a level 1 cache.

The example method 360 may further include using the resource constraint and the workload weight to automatically bind a workgroup to a set of computing resources identified by the constraint, wherein the binding is performed along hardware boundaries indicated by a hardware resource topology.

FIG. 10 is a flow diagram of a second example method 370 suitable for use with the embodiments of FIGS. 1-9. The second example method 370 facilitates allocating computing resources and includes a first step 372, which involves selectively grouping computer processing threads into one or more workloads (in accordance with workload requirements), wherein each of the one or more workloads is characterized by a set of one or more workload properties. The one or more workload properties include a workload weight and a workload constraint.

A second step 374 includes using the workload weight, the workload constraint, and a number of workloads associated with the group of computing resources, to bind each of the one or more workloads to one or more portions of the computing resources based on a topology of the computing resources.

A third step 376 includes detecting a change in the one or more workload properties, or the number of workloads, or the group of computing resources. A change in a group of computing resources may be effectuated by, for example, an administrator or application-level adjustment of the constraint property of a workload.

A fourth step 378 includes dynamically adjusting one or more bindings between each of the one or more workloads and the one or more portions of the computing resources in accordance with a detected change in the one or more workload properties.

Next, in a break-checking step 400, if a system break (e.g., system termination or power-down) has occurred, the method 370 completes. Otherwise, the method resumes (at the third step 376) system monitoring to detect any system changes affecting workloads, e.g., workload properties, numbers of workloads, groupings of computing resources, etc.

Note that the method 370 may be modified, without departing from the scope of the present teachings. For example, the method 370 may further specify that the one or more workloads include plural workloads.

The second step 374, which involves using the workload weight, may further include isolating plural workloads from each other by binding each workload to a disjunct set of CPUs that share as few common hardware resources as possible given a topology of the computing resources.

The topology or architecture may include hierarchically related groups of computing resources, wherein the groups of computing resources include processor groups, i.e., groups of CPUs. The one or more processor groups each include or otherwise identify the disjunct set of CPUs.

The disjunct CPUs form a Processor Group (PG). The disjunct CPUs of a PG are identified by one or more workload properties; in particular, a constraint property (also simply called a constraint herein) that identifies the one or more processor groups and associated disjunct set of CPUs.

The second step 374 may further include performing workload performance isolation, in part by ensuring that each workload constraint of the same type, which characterizes workloads to be isolated are bound to non-overlapping resource pools.

The second step 374 may be further augmented to include allocating hardware resources of a group of computing resources identified by the workload constraint to the one or more workloads characterized by the constraint in accordance with the workload weight, such that each workload is bound to an amount of hardware resources in proportion to the workload weight relative to an aggregate weight of all active workloads sharing a similar constraint and associated group of computing resources identified by the constraint.

The fourth step 378 may further include determining when the aggregate weight changes; then rebinding workloads to computing resources in accordance with the workload properties. The workload properties may include any new aggregated weight (i.e., total weight of all workloads), and the one or more groups of computing resources identified thereby, i.e., by the workload properties (e.g., the workload constraint property).

The example method 370 may further include determining when an interleave property of a workload to be bound to a group of computing resources is true and when a constraint property of the workload identifying the group of computing resources contains multiple locality groups. If both are true, then an augmented method may include binding threads of the workload to each locality group of the multiple locality groups in accordance with the weight.

The fourth step 378 may further include (for each set of one or more workloads characterized by similar constraints) recalculating one or more bindings between the one or more workloads and the portions of the computing resources of the group of computing resources identified by the similar constraints when a number of workloads of each set changes, or when a topology characterizing the group of computing resources changes, or when a property of a workload of the set changes.

The one or more portions of the computing resources may include one or more CPU cores and one or more computer caches or pipelines associated with each of the one or more CPU cores.

The one or more workload properties may further include a setting (i.e., workload property specification) identifying an affinity type for each of the one or more workloads. The one or more workload properties may further include an interleave setting indicating whether threads associated with a workload are permitted to be dispersed across plural resource locality groups or must be confined to resources of a single locality group.

The second example method 370 may further include providing a user interface (e.g., as provided via the administrator interface 14 of FIG. 1) enabling specification of the one or more workload properties by an authorized user of the user interface.

The second example method 370 may further include determining an arrangement of (e.g., topology characterizing) the group of computing resources in accordance with a combination of computer processing resources and associated memory resources, such that allocation of CPU shares to a workload corresponds to simultaneous allocation of memory resources along with the CPU shares, thereby facilitating hardware isolation.

The arrangement of the group of computing resources may be characterized by one or more locality groups. The one or more locality groups may each be grouped into a higher level group, thereby forming a hierarchy of groups of computing resources. The higher level group may represent or include a CPU socket. A CPU socket may refer to the computing resources provided by or representable via a single CPU socket that may be represented by a single CPU housing unit that is adapted for plugging in to a motherboard or other circuit.

The second example method 370 may further include performing the second method 370 for each level of the hierarchy, starting with a lowest level of the hierarchy. The lowest level of the hierarchy may be characterized by one or more locality groups (i.e., groups of CPUs sharing the highest level (in a resource topology) represents a collection of one or more leaf processor groups. Each leaf processor group includes plural CPU cores.

Hence, use of workload properties discussed herein, including workload weight, enables an on-demand workload resource allocator to bind resources in accordance with a priority or relevance indicated by the weight, and to perform the binding dynamically when the workload runs. Bindings of workloads in the system can be automatically adjusted in accordance with the properties associated with all workloads when a new workload is added. Workload bindings need not be static, but can be automatically adjusted by the underlying system.

Hardware computing resources to be allocated to hierarchically related resources, where the amount of resources (e.g., number of CPU shares, i.e., clock cycles and associated cache, memory, pipeline, etc., use) is based on configurable workload properties, which may include not just workload weight or priority, but affinity type specifying whether the workload should be weakly or strongly bound to hardware resources to facilitate either weak or strong workload performance isolation.

By enabling dynamic binding of selective groups of threads (i.e., workloads) associated with software applications, projects, processes, and so on, to disjoint CPUs. In certain implementations, software (e.g., APIs) provided by existing operating systems (e.g., Solaris) include callable routines and/or other functionality facilitating implementation of embodiments discussed herein by those skilled in the art without undue experimentation.

Recall that, as set forth above, a weak workload affinity property setting allows threads of a workload to run outside of the preferred allocated set of CPUs and associated resources (e.g., resources used by the allocated CPUs, including any cache, pipelines, etc.). A strong affinity type binding restricts workloads to using an identified, i.e., allocated or bound set of CPUs and associated hardware resources.

Various embodiments discussed herein may enable multi-level sharing of resources to occur between different resources on different levels and/or processor groups of a hierarchical resource topology. Note that, for the purposes of the present discussion, the term hardware resource may include virtualized hardware resources, wherein an underlying hardware resource topology can be selectively modified and presented to a guest operating system in accordance with a hardware resource topology.

Accordingly, certain embodiments discussed herein may act to connect a previously existing disconnect between CPU resource allocation and allocation of memory and other resources associated with the CPUs being allocated. Note that additional CPU throttling technology, e.g., resource management systems and methods, may be used in combination with various embodiments discussed herein, without departing from the scope of the present teachings.

Various embodiments discussed herein facilitate CPU resource allocation to workloads (or vice versa) while minimizing the degree of shared hardware components between different running workloads, thereby significantly reducing mutual workload performance impact on degradation of workload QoS of competing workloads.

In summary, the number of CPUs and amount of associated CPU cache, pipeline, memory and other CPU resources, when allocated according to disjoint processor groups as discussed herein, enables automatic (i.e., dynamic) scaling of allocated resources in accordance with workload eights, the number of existing workloads and their associated properties and/or other workload properties.

When more workloads are active than hardware components exist, some workloads allocations will partially overlap, but such resources may still be relatively isolated from the majority of other workloads, as compared to existing CPU resource allocation mechanisms.

Recall that certain embodiments discussed herein allow threads of a workload to migrate to different lgroups within a binding defining a resource pool when an affinity property of the workload is set to weak. Bindings may be automatically recalculated (upon change in number of workloads, a workload property (e.g., weight) changes, processor group topology, etc.) using a procedure that minimizes overlap and interference between workloads, while substantially maintaining relative weights of workloads.

Threads of a workload are kept relatively close together (in terms of CPU memory, cache, pipeline, and associated CPU resource usage), i.e., they are allotted CPU resources that are within a locality group, by a scheduler and/or dispatcher, even if a particular workload constraint is not specified, e.g., as discussed with reference to FIG. 8.

Note that two workloads with the same constraint, i.e., assigned to be allocated to the same hardware resource pool, do not bind threads to the same CPU unless more workloads than processor groups (e.g. lgroups) are deployed and running on the underlying system.

For optimal workload performance isolation, workloads are assigned different workload constraints for all workloads to be strictly isolated. The different workload constraints specify disjoint resource pools, where the different pools do not overlap on the level of the hardware resource topology at which a given binding is being calculated. Within a given group of hardware resources specified by a constraint, hardware resources are split among competing workloads to be isolated in accordance with individual workload weights as a percentage or function of total workloads of all workloads to be allocated hardware resources of the hardware resource group, i.e., processor group, e.g., lgroup, and/or collections of such groups specified by the constraint.

Hence, each workload is allocated resources in proportion or in approximate proportion to the workload weight divided by the aggregate weight of all active workloads for the same constraint identified by the workload constraint setting, i.e., property.

If the aggregate weight changes, e.g., when new workloads are created; when existing workloads are deleted; or when the weight of a workload changes, all workloads within the same constraint are automatically rebound, accounting for the new weight and the new total weight of all workloads.

If a NUMA interleaving workload setting for a workload is true, and the workload constraint includes multiple lgroups, then workloads are bound to each lgroup proportional to the ratio or percentage that the workload weight represents as compared to all workload weights competing for resources of collection of hardware resources specified by the constraint. Workload bindings may be individually applied to each NUMA node. A thread of a workload is bound to the same NUMA node until rebound. Rebinding to accommodate different workload settings or different newly added, removed, or changed workloads and/or changed workload settings, is a relatively quick process, where the new bindings take effect at the next context switch.

Although the description has been described with respect to particular embodiments thereof, these particular embodiments are merely illustrative, and not restrictive. For example, while various embodiments are discussed herein with reference to mechanisms and methods for allocating CPU processing and memory resources in networked computing environments, embodiments are not limited thereto. Any computing environment with computing resource provisioning needs among processing tasks, projects, applications, or other workloads, whether or not the computing environment includes networked enterprise applications or not, may benefit through selective binding of resources to workloads in accordance with embodiments discussed herein. Furthermore, bound resources need not include or be limited to computer processing resources, but may include, for example, data storage resources (e.g., database resources), without departing from the scope of the present teachings.

Furthermore, note that hardware resource allocation as discussed herein may extend beyond operating system virtualization implementations, e.g., allocation of CPUs to workloads (in this case VMs) is done by a hypervisor. For example, Xen-based x86 hypervisors may be employed, and conventional LDOMs may be replaced with Xen VMs or containers.

In general, embodiments discussed herein may be suited to several use cases, including, but not limited to:

(1) Workloads such as applications, projects, tasks, PDBs, etc., deployed on a common operating system that runs the workload performance isolator and enforces the binding (e.g. through MCB).

(2) VMs that are running on top of an operating system, e.g., Solaris Kernel Zones. The workload performance isolator would run inside the host operating system and could use technologies like MCB or others to enforce the binding.

(3) VMs that are running on top of a hypervisor like Xen, where the hypervisor runs the workload performance isolator and enforces the binding. In case of Xen, the hypervisor is a microkernel running Linux.

(4) LDOMs that are running on top of a SPARC hypervisor, where the workload performance isolator runs inside a primary LDOM and enforces the binding by adding and removing VCPUs from the guest LDOMs through the LDOMs manager.

Note that the embodiment of FIG. 1 describes use case (1). Generalizing the term "application, project, task" to include also VMs, such as Kernel Zones (in case of Solaris) or OVM/Xen (in case of Linux/x86), then the embodiment of FIG. 1 may extend to use cases (2) and (3). The embodiment of FIG. 2, i.e., system 60, may be configured to implement one or more of the use cases (2), (3), and (4).

Note that regarding use cases (2) and (3), if a VM is (based on its weight and the total weight) entitled to fewer physical CPUs than it has VCPUs assigned, then strong binding to these resources may prevent the VM from using all of its VCPUs simultaneously. For example, a VM with 16 VCPUs that is strong-bound to 8 physical CPUs would only use 8 CPUs at a time, even if it dispatched work to all of its 16 VCPUs. This issue may be addressed by using weak affinities or by changing the number of VCPUs inside the VM each time the workload performance isolator determines a new resource allocation.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for allocating computing resources to two or more workloads on a multiple processors computing system wherein the multiple processors are organized in a processor group (PG) hierarchy with one or more hierarchical levels, and wherein each of the two or more workloads comprises at least one thread, the method comprising:
   for each of the two or more workloads, determining one or more workload properties, the one or more workload properties including a workload weight;
   determining a binding for each of the two or more workloads, by:
   (a) sorting the two or more workloads by workload weight in ascending order;
   (b) calculating a total weight by summing the workload weights of the two or more workloads;
   (c) for each of the two or more workloads:
      (i) determining a current weight based on remaining weight to be assigned and a number of PGs present at a lowest PG hierarchical level;
      (ii) determining a current hierarchical level based on the current weight and a number of PGs present at each of the one or more hierarchical levels;
      (iii) for the current hierarchical level, determining a PG start position and a number of PGs to bind the workload to by multiplying a number of PGs at the current hierarchical level with the workload's workload weight and dividing by the current weight;
   assigning the two or more workloads to PGs by binding their threads to Central Processing Units (CPUs) of the PGs determined for each of the workloads in step (c)(iii);
   executing the threads from the two or more workloads on the CPUs of the PGs;
   detecting a change in at least one of a workload property, a total number of workloads, or the PG hierarchy; and
   upon detecting a change, dynamically adjusting one or more bindings, and reassigning at least one of the two or more workloads while continuing execution of the two or more workloads' threads.

2. The method of claim 1, wherein the one or more workload properties include a constraint identifying an affinity with one or more processor groups, wherein the affinity may be strong or weak.

3. The method of claim 2, wherein using determining a binding further includes performing workload performance isolation at a hierarchical level in part by ensuring that a workload to be isolated is bound to a group of PGs that does not overlap with another group of PGs at the hierarchical level.

4. The method of claim 1, further including, when an interleave property of a workload is true and a constraint property of the workload identifying the multiple processors contains multiple locality groups, then binding threads of the workload to each locality group of the multiple locality groups in accordance with the workload weight.

5. The method of claim 2, wherein dynamically adjusting further includes, for each set of one or more workloads characterized by similar workload properties, recalculating one or more bindings between the one or more workloads and portions of the multiple processors identified by the similar constraints when a number of workloads of each set changes; when a topology characterizing the multiple processors changes, or when a property of a workload of the set changes.

6. The method of claim 1, wherein the multiple processors include one or more CPU cores and one or more computer caches or pipelines associated with each of the one or more CPU cores.

7. The method of claim 2, wherein the one or more workload properties further include an interleave setting indicating whether threads included in a workload are permitted to be dispersed across plural locality groups or must be confined to a single locality group.

8. The method of claim 1, further including providing a user interface enabling specification of the one or more workload properties by an authorized user of the user interface.

9. The method of claim 1, further including determining an arrangement of the multiple processors in accordance with a combination of computer processing resources and associated memory resources, such that allocation of CPU shares to a workload corresponds to simultaneous allocation of memory resources along with the CPU shares, thereby facilitating hardware isolation.

10. The method of claim 9, wherein the arrangement of the multiple processors is characterized by one or more locality groups.

11. The method of claim 10, wherein the one or more locality groups are part of the PG hierarchy.

12. The method of claim 11, wherein the PG hierarchy includes a CPU socket.

13. The method of claim 11, further including performing the method for each hierarchical level, starting with a lowest hierarchical level, wherein the lowest hierarchical level is characterized by one or more leaf processor groups included within one or more locality groups, the one or more leaf processor groups each including plural CPU cores.

14. A system for allocating computing resources to workloads running in a computing environment, wherein multiple processors are organized in a processor group (PG) hierarchy with one or more hierarchical levels, and wherein each of two or more workloads comprises at least one thread, the computing environment including at least one computer running resource allocation software, wherein the resource allocation software is programmed to perform a method comprising:
  for each of the two or more workloads, determining one or more workload properties, the one or more workload properties including a workload weight;
  determining a binding for each of the two or more workloads, by:
    (a) sorting the two or more workloads by workload weight in ascending order;
    (b) calculating a total weight by summing the workload weights of the two or more workloads;
    (c) for each of the two or more workloads:
      (i) determining a current weight based on remaining weight to be assigned and a number of PGs present at a lowest PG hierarchical level;
      (ii) determining a current hierarchical level based on the current weight and a number of PGs present at each of the one or more hierarchical levels;
      (iii) for the current hierarchical level, determining a PG start position and a number of PGs to bind the workload to by multiplying a number of PGs at the current hierarchical level with the workload's workload weight and dividing by the current weight;
  assigning the two or more workloads to PGs by binding their threads to Central Processing Units (CPUs) of the PGs determined for each of the workloads in step (c)(iii);
  executing the threads from the two or more workloads on the CPUs of the PGs;
  detecting a change in one of a workload property, a total number of workloads, and the PG hierarchy; and
  upon detecting a change, dynamically adjusting one or more bindings, and reassigning at least one of the two or more workloads while continuing execution of the two or more workloads' threads.

15. A tangible, non-transitory computer-readable information storage medium including instructions adapted to direct a processor to perform a series of operations on a computing system with multiple processors organized in a processor group (PG) hierarchy with one or more hierarchical levels, and wherein each of two or more workloads comprises at least one thread, the operations comprising:
  for each of the two or more workloads, determining one or more workload properties, the one or more workload properties including a workload weight;
  determining a binding for each of the two or more workloads, by:
    (a) sorting the two or more workloads by workload weight in ascending order;
    (b) calculating a total weight by summing the workload weights of the two or more workloads;
    (c) for each of the two or more workloads:
      (i) determining a current weight based on remaining weight to be assigned and a number of PGs present at a lowest PG hierarchical level;
      (ii) determining a current hierarchical level based on the current weight and a number of PGs present at each of the one or more hierarchical levels;
      (iii) for the current hierarchical level, determining a PG start position and a number of PGs to bind the workload to by multiplying a number of PGs at the current hierarchical level with the workload's workload weight and dividing by the current weight;
  assigning the two or more workloads to PGs by binding their threads to Central Processing Units (CPUs) of the PGs determined for each of the workloads in step (c)(iii);
  executing the threads from the two or more workloads on the CPUs of the PGs;
  detecting a change in one of a workload property, a total number of workloads, and the PG hierarchy; and
  upon detecting a change, dynamically adjusting one or more bindings, and reassigning at least one of the two or more workloads while continuing execution of the two or more workloads' threads.

* * * * *

UNITED STATES PATENT AND TRADEMARK OFFICE
CERTIFICATE OF CORRECTION

PATENT NO. : 9,921,880 B2  
APPLICATION NO. : 15/009395  
DATED : March 20, 2018  
INVENTOR(S) : Michael et al.

Page 1 of 1

It is certified that error appears in the above-identified patent and that said Letters Patent is hereby corrected as shown below:

On the Title Page

Column 2, under Other Publications, Line 3, delete "10.1.68." and insert -- 10.1.1.68. --, therefor.

On page 2, Column 1, under Other Publications, Line 2, delete "www.vldb/" and insert -- www.vldb.org/pvldb/ --, therefor.

On page 2, Column 1, under Other Publications, Line 3, delete "2013," and insert -- 2013; --, therefor.

In the Specification

In Column 15, Line 60, delete "VM1" and insert -- VM 1 --, therefor.

In Column 16, Line 44, delete "VM 1" and insert -- VM1 --, therefor.

In the Claims

In Column 32, Line 27, in Claim 3, after "wherein" delete "using".

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*